(12) United States Patent
Edlund et al.

(10) Patent No.: US 12,138,586 B2
(45) Date of Patent: *Nov. 12, 2024

(54) HYDROGEN PURIFICATION DEVICES

(71) Applicant: Element 1 Corp., Bend, OR (US)

(72) Inventors: David J. Edlund, Bend, OR (US); Robert Todd Studebaker, Bend, OR (US)

(73) Assignee: Element 1 Corp, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,424

(22) Filed: Aug. 24, 2023

(65) Prior Publication Data

US 2024/0042379 A1 Feb. 8, 2024

Related U.S. Application Data

(60) Continuation of application No. 17/412,581, filed on Aug. 26, 2021, now Pat. No. 11,738,305, which is a
(Continued)

(51) Int. Cl.
*B01D 53/22* (2006.01)
*B01D 63/08* (2006.01)
(Continued)

(52) U.S. Cl.
CPC ......... *B01D 53/228* (2013.01); *B01D 53/226* (2013.01); *B01D 63/082* (2013.01);
(Continued)

(58) Field of Classification Search
CPC ................ B01D 53/228; B01D 53/226; B01D 71/02231; B01D 63/082; B01D 2053/221;
(Continued)

(56) References Cited

U.S. PATENT DOCUMENTS 2,151,329 A 3/1939 Page et al.
2,196,463 A 4/1940 Holleran
(Continued)

FOREIGN PATENT DOCUMENTS

CA 2467012 A1 4/2001
CN 1384043 A 12/2002
(Continued)

OTHER PUBLICATIONS

Office Action prepared by the US Patent and Trademark Office for U.S. Appl. No. 16/287,482, dated Jun. 12, 2019, 10 pages.
(Continued)

*Primary Examiner* — Matthew J Merkling
(74) *Attorney, Agent, or Firm* — Chernoff, Vilhauer, McClung & Stenzel, LLP

(57) ABSTRACT

Hydrogen purification devices and their components are disclosed. In some embodiments, the devices may include at least one foil-microscreen assembly disposed between and secured to first and second end frames. The at least one foil-microscreen assembly may include at least one hydrogen-selective membrane and at least one microscreen structure including a non-porous planar sheet having a plurality of apertures forming a plurality of fluid passages. The planar sheet may include generally opposed planar surfaces configured to provide support to the permeate side. The plurality of fluid passages may extend between the opposed surfaces. The at least one hydrogen-selective membrane may be metallurgically bonded to the at least one microscreen structure.

23 Claims, 9 Drawing Sheets

Related U.S. Application Data continuation-in-part of application No. 16/904,872, filed on Jun. 18, 2020, now Pat. No. 11,103,828, which is a division of application No. 15/862,474, filed on Jan. 4, 2018, now Pat. No. 10,717,040, which is a continuation-in-part of application No. 15/483,265, filed on Apr. 10, 2017, now Pat. No. 10,166,506, which is a continuation of application No. 14/931,585, filed on Nov. 3, 2015, now Pat. No. 9,616,389, which is a division of application No. 13/829,766, filed on Mar. 14, 2013, now Pat. No. 9,187,324, which is a continuation-in-part of application No. 13/600,096, filed on Aug. 30, 2012, now abandoned.

(60) Provisional application No. 63/071,139, filed on Aug. 27, 2020.

(51) Int. Cl.
| | |
|---|---|
| *B01D 71/02* | (2006.01) |
| *B23K 20/02* | (2006.01) |
| *B23K 20/16* | (2006.01) |
| *B23K 20/22* | (2006.01) |
| *B23K 103/08* | (2006.01) |
| *C01B 3/50* | (2006.01) |

(52) U.S. Cl.
CPC ....... *B01D 63/0822* (2022.08); *B01D 71/022* (2013.01); *B01D 71/02231* (2022.08); *B23K 20/023* (2013.01); *B23K 20/16* (2013.01); *B23K 20/22* (2013.01); *C01B 3/505* (2013.01); *B01D 2053/221* (2013.01); *B01D 2053/222* (2013.01); *B01D 2256/16* (2013.01); *B01D 2257/502* (2013.01); *B01D 2257/504* (2013.01); *B01D 2257/7022* (2013.01); *B01D 2257/7025* (2013.01); *B01D 2257/80* (2013.01); *B23K 20/026* (2013.01); *B23K 2103/08* (2018.08); *C01B 2203/0233* (2013.01); *C01B 2203/0405* (2013.01); *C01B 2203/0445* (2013.01); *C01B 2203/0827* (2013.01); *C01B 2203/0883* (2013.01); *C01B 2203/1223* (2013.01); *C01B 2203/1288* (2013.01); *C01B 2203/142* (2013.01); *C01B 2203/1619* (2013.01)

(58) Field of Classification Search
CPC .............. B01D 2053/222; C01B 3/505; C01B 2203/0233; C01B 2203/0405; C01B 2203/0445; C01B 2203/0827; C01B 2203/0883; C01B 2203/1223; C01B 2203/1288; C01B 2203/142
See application file for complete search history.

(56) References Cited

U.S. PATENT DOCUMENTS

| | | | |
|---|---|---|---|
| 3,154,920 | A | 11/1964 | Nash et al. |
| 3,415,634 | A | 12/1968 | Dent et al. |
| 3,421,871 | A | 1/1969 | Davies et al. |
| 3,586,621 | A | 6/1971 | Pitchford et al. |
| 3,608,610 | A | 9/1971 | Greatorex et al. |
| 3,642,460 | A | 2/1972 | Thompson |
| 3,737,291 | A | 6/1973 | Lhonore et al. |
| 3,761,382 | A | 9/1973 | Hammond et al. |
| 3,761,386 | A | 9/1973 | Smith |
| 3,825,490 | A | 7/1974 | Vachuda |
| 3,838,994 | A | 10/1974 | Aldridge |
| 3,888,043 | A | 6/1975 | Child et al. |
| 3,935,636 | A | 2/1976 | Mermelstein |
| 3,984,324 | A | 10/1976 | Wang |
| 4,104,201 | A | 8/1978 | Banks et al. |
| 4,124,478 | A | 11/1978 | Tsien et al. |
| 4,319,978 | A | 3/1982 | Millman |
| 4,345,555 | A | 8/1982 | Oshima et al. |
| 4,472,176 | A | 9/1984 | Rubin |
| 4,692,306 | A | 9/1987 | Minet et al. |
| 4,702,312 | A | 10/1987 | Brown |
| 4,887,556 | A | 12/1989 | Gladstone |
| 4,896,636 | A | 1/1990 | Pfefferle |
| 5,053,195 | A | 10/1991 | MacKay |
| 5,112,527 | A | 5/1992 | Kobylinski |
| 5,139,541 | A | 8/1992 | Edlund |
| 5,146,881 | A | 9/1992 | Pfefferle |
| 5,164,163 | A | 11/1992 | Aoki et al. |
| 5,182,075 | A | 1/1993 | Gotoh et al. |
| 5,217,506 | A | 6/1993 | Edlund et al. |
| 5,259,870 | A | 11/1993 | Edlund |
| 5,266,283 | A | 11/1993 | Friesen et al. |
| 5,281,254 | A | 1/1994 | Birbara et al. |
| 5,393,325 | A | 2/1995 | Edlund |
| 5,498,278 | A | 3/1996 | Edlund |
| 5,536,405 | A | 7/1996 | Myrna et al. |
| 5,580,476 | A | 12/1996 | Dam et al. |
| 5,636,511 | A | 6/1997 | Pfefferle et al. |
| 5,645,626 | A | 7/1997 | Edlund et al. |
| 5,711,882 | A | 1/1998 | Hofmann et al. |
| 5,782,960 | A | 7/1998 | Ogawa et al. |
| 2,196,343 | A | 8/1998 | Saltsman |
| 5,791,308 | A | 8/1998 | Carter et al. |
| 5,861,137 | A | 1/1999 | Edlund |
| 5,888,273 | A | 3/1999 | Buxbaum |
| 5,904,754 | A | 5/1999 | Juda et al. |
| 5,964,089 | A | 10/1999 | Murphy et al. |
| 5,997,594 | A | 12/1999 | Edlund et al. |
| 6,103,028 | A | 8/2000 | Juda et al. |
| 6,136,222 | A | 10/2000 | Friesen et al. |
| 6,152,995 | A | 11/2000 | Edlund |
| 6,168,650 | B1 | 1/2001 | Buxbaum |
| 6,171,574 | B1 | 1/2001 | Juda et al. |
| 6,183,542 | B1 | 2/2001 | Bossard |
| 6,183,543 | B1 | 2/2001 | Buxbaum |
| 6,189,568 | B1 | 2/2001 | Bergum et al. |
| 6,221,117 | B1 | 4/2001 | Edlund et al. |
| 6,241,945 | B1 | 6/2001 | Owen |
| 6,319,306 | B1 | 11/2001 | Edlund et al. |
| 6,332,913 | B1 | 12/2001 | Breitschwedt et al. |
| 6,368,742 | B2 | 4/2002 | Fisher et al. |
| 6,375,906 | B1 | 4/2002 | Edlund et al. |
| 6,376,113 | B1 | 4/2002 | Edlund et al. |
| 6,383,670 | B1 | 5/2002 | Edlund et al. |
| 6,402,818 | B1 | 6/2002 | Sengupta |
| 6,419,728 | B1 | 7/2002 | Edlund |
| 6,451,464 | B1 | 9/2002 | Edlund et al. |
| 6,458,189 | B1 | 10/2002 | Edlund et al. |
| 6,465,118 | B1 | 10/2002 | Dickman et al. |
| 6,475,268 | B2 | 11/2002 | Thornton |
| 6,494,937 | B1 | 12/2002 | Edlund et al. |
| 6,495,277 | B1 | 12/2002 | Edlund et al. |
| 6,511,521 | B1 | 1/2003 | Parchamazad |
| 6,537,352 | B2 | 3/2003 | Edlund et al. |
| 6,547,858 | B1 | 4/2003 | Edlund et al. |
| 6,562,111 | B2 | 5/2003 | Edlund et al. |
| 6,564,579 | B1 | 5/2003 | McCartney |
| 6,569,227 | B2 | 5/2003 | Edlund et al. |
| 6,596,057 | B2 | 7/2003 | Edlund et al. |
| 6,616,841 | B2 | 9/2003 | Cho et al. |
| 6,632,270 | B2 | 10/2003 | Edlund et al. |
| 6,660,069 | B2 | 12/2003 | Sato et al. |
| 6,667,128 | B2 | 12/2003 | Edlund |
| 6,719,831 | B2 | 4/2004 | Edlund et al. |
| 6,719,832 | B2 | 4/2004 | Edlund et al. |
| 6,723,156 | B2 | 4/2004 | Edlund et al. |
| 6,758,101 | B2 | 7/2004 | Valentine |
| 6,767,389 | B2 | 7/2004 | Edlund et al. |
| 6,783,741 | B2 | 8/2004 | Edlund et al. |
| 6,811,908 | B2 | 11/2004 | Edlund et al. |
| 6,818,335 | B2 | 11/2004 | Edlund et al. |
| 6,824,593 | B2 | 11/2004 | Edlund et al. |
| 6,835,481 | B2 | 12/2004 | Dickman et al. |

(56) References Cited

U.S. PATENT DOCUMENTS

| | | |
|---|---|---|
| 6,858,341 B2 | 2/2005 | Edlund |
| 6,869,707 B2 | 3/2005 | Edlund et al. |
| 6,872,464 B2 | 3/2005 | Hubner et al. |
| 6,878,474 B2 | 4/2005 | Dickman et al. |
| 6,890,672 B2 | 5/2005 | Dickman et al. |
| 6,896,709 B1 | 5/2005 | Han et al. |
| 6,953,497 B2 | 10/2005 | Edlund et al. |
| 6,979,507 B2 | 12/2005 | Edlund et al. |
| 6,979,801 B2 | 12/2005 | Okazaki et al. |
| 6,994,927 B2 | 2/2006 | Edlund et al. |
| 7,005,113 B2 | 2/2006 | Edlund et al. |
| 7,008,708 B2 | 3/2006 | Edlund et al. |
| 7,022,395 B2 | 4/2006 | Ackerman et al. |
| 7,029,515 B2 | 4/2006 | Krueger |
| 7,033,641 B2 | 4/2006 | Saijo et al. |
| 7,052,530 B2 | 5/2006 | Edlund et al. |
| 7,063,047 B2 | 6/2006 | Reinke et al. |
| 7,101,421 B2 | 9/2006 | Edlund et al. |
| 7,135,048 B1 | 11/2006 | Edlund et al. |
| 7,147,677 B2 | 12/2006 | Edlund |
| 7,182,917 B2 | 2/2007 | Krueger |
| 7,195,663 B2 | 3/2007 | Edlund et al. |
| 7,201,783 B2 | 4/2007 | Edlund |
| 7,208,241 B2 | 4/2007 | Edlund et al. |
| 7,250,231 B2 | 7/2007 | Edlund |
| 7,258,946 B2 | 8/2007 | Edlund |
| 7,297,183 B2 | 11/2007 | Edlund et al. |
| 7,306,868 B2 | 12/2007 | Arthur |
| 7,341,609 B2 | 3/2008 | DeVries |
| 7,368,194 B2 | 5/2008 | Dickman et al. |
| 7,368,195 B2 | 5/2008 | Edlund et al. |
| 7,390,587 B2 | 6/2008 | Dickman et al. |
| 7,410,531 B2 | 8/2008 | Edlund et al. |
| 7,470,293 B2 | 12/2008 | Edlund et al. |
| 7,476,455 B2 | 1/2009 | Edlund |
| 7,485,381 B2 | 2/2009 | Dickman et al. |
| 7,601,302 B2 | 10/2009 | Edlund et al. |
| 7,632,321 B2 | 12/2009 | Edlund |
| 7,632,322 B2 | 12/2009 | Edlund |
| 7,641,795 B2 | 1/2010 | Taylor et al. |
| 7,659,019 B2 | 2/2010 | Edlund |
| 7,682,718 B2 | 3/2010 | Dickman et al. |
| 7,736,596 B2 | 6/2010 | Edlund et al. |
| 7,771,882 B2 | 8/2010 | Edlund et al. |
| 7,789,941 B2 | 9/2010 | Edlund et al. |
| 7,819,955 B2 | 10/2010 | Edlund et al. |
| 7,828,864 B2 | 11/2010 | Edlund et al. |
| 7,846,569 B2 | 12/2010 | Edlund et al. |
| 7,939,211 B2 | 5/2011 | Edlund et al. |
| 7,977,000 B2 | 7/2011 | Edlund |
| 7,981,172 B2 | 7/2011 | Edlund et al. |
| 7,985,510 B2 | 7/2011 | Edlund et al. |
| 8,021,446 B2 | 9/2011 | Adams et al. |
| 8,038,748 B2 | 10/2011 | Edlund |
| 8,057,575 B2 | 11/2011 | Edlund et al. |
| 8,133,626 B2 | 3/2012 | Edlund et al. |
| 8,226,751 B2 | 7/2012 | Ishibe et al. |
| 8,262,752 B2 | 9/2012 | Popham |
| 8,603,219 B2 | 12/2013 | Edlund et al. |
| 8,956,428 B2 | 2/2015 | Carnell et al. |
| 8,961,627 B2 | 2/2015 | Edlund |
| 9,187,324 B2 | 11/2015 | Edlund |
| 9,616,389 B2 | 4/2017 | Edlund |
| 9,656,215 B2 | 5/2017 | Edlund |
| 9,777,237 B2 | 10/2017 | Edlund |
| 9,914,641 B2 | 5/2018 | Edlund et al. |
| 10,166,506 B2 | 1/2019 | Edlund |
| 10,273,423 B2 | 4/2019 | Edlund |
| 10,391,458 B2 | 8/2019 | Edlund |
| 10,702,827 B2 | 7/2020 | Edlund |
| 2001/0045061 A1 | 11/2001 | Edlund et al. |
| 2002/0041837 A1 | 4/2002 | Edlund et al. |
| 2002/0071976 A1 | 6/2002 | Edlund |
| 2002/0081235 A1 | 6/2002 | Baldwin et al. |
| 2002/0083829 A1 | 7/2002 | Edlund et al. |
| 2002/0100518 A1 | 8/2002 | Kuriiwa et al. |
| 2002/0114984 A1 | 8/2002 | Edlund et al. |
| 2003/0015096 A1 | 1/2003 | Sato et al. |
| 2003/0033933 A1 | 2/2003 | Frost et al. |
| 2003/0087138 A1 | 5/2003 | Margiott et al. |
| 2003/0091876 A1 | 5/2003 | Rusta-Sellehy et al. |
| 2003/0167690 A1 | 9/2003 | Edlund et al. |
| 2003/0172589 A1 | 9/2003 | Krueger |
| 2003/0192251 A1 | 10/2003 | Edlund et al. |
| 2003/0213365 A1 | 11/2003 | Jantsch et al. |
| 2003/0223926 A1 | 12/2003 | Edlund et al. |
| 2003/0223931 A1 | 12/2003 | Narayan |
| 2003/0228442 A1 | 12/2003 | Prince et al. |
| 2004/0003720 A1 | 1/2004 | Beisswenger et al. |
| 2004/0005720 A1 | 1/2004 | Cremer et al. |
| 2004/0065013 A1 | 4/2004 | DeVries |
| 2004/0066043 A1 | 4/2004 | Maiwald et al. |
| 2004/0067195 A1 | 4/2004 | Strizki et al. |
| 2004/0081867 A1 | 4/2004 | Edlund |
| 2004/0081868 A1 | 4/2004 | Edlund |
| 2004/0099138 A1 | 5/2004 | Karode et al. |
| 2004/0197616 A1 | 10/2004 | Edlund et al. |
| 2004/0200459 A1 | 10/2004 | Bennett et al. |
| 2004/0229090 A1 | 11/2004 | Davis et al. |
| 2005/0000802 A1 | 1/2005 | Hobbs |
| 2005/0074648 A1 | 4/2005 | Arthur |
| 2005/0129995 A1 | 6/2005 | Kato |
| 2005/0132640 A1 | 6/2005 | Kelly et al. |
| 2005/0154198 A1 | 7/2005 | Trotta et al. |
| 2005/0172554 A1 | 8/2005 | Basho et al. |
| 2005/0188616 A1 | 9/2005 | Bizjak et al. |
| 2005/0211480 A1 | 9/2005 | Kejha |
| 2005/0265915 A1 | 12/2005 | Tonkovich et al. |
| 2006/0019134 A1 | 1/2006 | Yagi et al. |
| 2006/0037244 A1 | 2/2006 | Clawson |
| 2006/0037476 A1 | 2/2006 | Edlund et al. |
| 2006/0051638 A1 | 3/2006 | Gross |
| 2006/0081524 A1 | 4/2006 | Sengupta et al. |
| 2006/0083956 A1 | 4/2006 | Ukai et al. |
| 2006/0090397 A1 | 5/2006 | Edlund et al. |
| 2006/0112636 A1 | 6/2006 | Chellappa et al. |
| 2006/0127719 A1 | 6/2006 | Brantley et al. |
| 2006/0144700 A1 | 7/2006 | Carson et al. |
| 2006/0144788 A1 | 7/2006 | Cath et al. |
| 2006/0216562 A1 | 9/2006 | Edlund et al. |
| 2006/0225350 A1 | 10/2006 | Spallone |
| 2006/0233700 A1 | 10/2006 | Chellappa et al. |
| 2006/0272212 A1 | 12/2006 | Edlund |
| 2007/0062116 A1 | 3/2007 | Edlund et al. |
| 2007/0074904 A1 | 4/2007 | Kohora et al. |
| 2007/0172402 A1 | 7/2007 | Palo et al. |
| 2007/0183968 A1 | 8/2007 | Healey et al. |
| 2007/0190380 A1 | 8/2007 | DeVries |
| 2007/0266631 A1 | 11/2007 | Pledger et al. |
| 2007/0274904 A1 | 11/2007 | Popham et al. |
| 2007/0292729 A1 | 12/2007 | Brantley et al. |
| 2008/0029389 A1 | 2/2008 | Dreier et al. |
| 2008/0031809 A1 | 2/2008 | Norbeck et al. |
| 2008/0041454 A1 | 2/2008 | Eijkelenberg et al. |
| 2008/0075987 A1 | 3/2008 | Kindler et al. |
| 2008/0085434 A1 | 4/2008 | Arthur |
| 2008/0115669 A1 | 5/2008 | Edlund et al. |
| 2008/0138677 A1 | 6/2008 | Edlund |
| 2008/0138678 A1 | 6/2008 | Hill |
| 2008/0176118 A1 | 7/2008 | Edlund et al. |
| 2008/0187797 A1 | 8/2008 | Edlund |
| 2008/0210088 A1 | 9/2008 | Pledger |
| 2008/0213638 A1 | 9/2008 | Brantley et al. |
| 2008/0222954 A1 | 9/2008 | Adams et al. |
| 2008/0230039 A1 | 9/2008 | Weiss et al. |
| 2009/0011310 A1 | 1/2009 | Trabold et al. |
| 2010/0028223 A1 | 2/2010 | Popham et al. |
| 2010/0050520 A1 | 3/2010 | Arnold et al. |
| 2010/0055518 A1 | 3/2010 | Chen et al. |
| 2010/0064887 A1 | 3/2010 | Edlund et al. |
| 2010/0068132 A1 | 3/2010 | Vencill et al. |
| 2010/0167155 A1 | 7/2010 | Kim et al. |
| 2010/0181765 A1 | 7/2010 | More et al. |
| 2010/0230079 A1 | 9/2010 | Byers et al. |

(56) References Cited

U.S. PATENT DOCUMENTS

| | | |
|---|---|---|
| 2010/0261074 A1 | 10/2010 | Edlund et al. |
| 2010/0263538 A1 | 10/2010 | DeVries |
| 2011/0014528 A1 | 1/2011 | Kani et al. |
| 2011/0111314 A1 | 5/2011 | Cui et al. |
| 2011/0137537 A1 | 6/2011 | Leone |
| 2011/0180396 A1 | 7/2011 | Giacomini |
| 2011/0212375 A1 | 9/2011 | Taguchi et al. |
| 2011/0250518 A1 | 10/2011 | Edlund et al. |
| 2011/0256459 A1 | 10/2011 | Edlund |
| 2011/0256491 A1 | 10/2011 | Edlund et al. |
| 2012/0058403 A1 | 3/2012 | Edlund et al. |
| 2012/0097610 A1 | 4/2012 | Zheng et al. |
| 2012/0208903 A1 | 8/2012 | Gafney |
| 2013/0011301 A1 | 1/2013 | Edlund |
| 2013/0090505 A1 | 4/2013 | Catchpole |
| 2013/0255487 A1 | 10/2013 | Edlund et al. |
| 2014/0065020 A1 | 3/2014 | Edlund et al. |
| 2014/0065021 A1 | 3/2014 | Edlund |
| 2014/0326447 A1 | 11/2014 | Fermaniuk |
| 2015/0122128 A1 | 5/2015 | Edlund |
| 2016/0083251 A1 | 3/2016 | Edlund et al. |
| 2016/0130515 A1 | 5/2016 | Edlund |
| 2016/0131424 A1 | 5/2016 | Edlund |
| 2016/0325990 A1 | 10/2016 | Galloway |
| 2016/0340185 A1 | 11/2016 | Xiang |
| 2017/0043300 A1 | 2/2017 | Stoltenberg et al. |
| 2017/0209828 A1 | 7/2017 | Edlund |
| 2017/0216805 A1 | 8/2017 | Edlund |
| 2018/0126330 A1 | 5/2018 | Edlund et al. |
| 2018/0264398 A1 | 9/2018 | Edlund et al. |
| 2019/0118132 A1 | 4/2019 | Edlund |
| 2019/0135626 A1 | 5/2019 | Rafati et al. |
| 2019/0336920 A1 | 11/2019 | Edlund |
| 2020/0289977 A1 | 9/2020 | Edlund |
| 2020/0289978 A1 | 9/2020 | Edlund |
| 2020/0316517 A1 | 10/2020 | Edlund |
| 2021/0162335 A1 | 6/2021 | Edlund |

FOREIGN PATENT DOCUMENTS

| | | | |
|---|---|---|---|
| CN | 1524308 A | | 8/2004 |
| CN | 1931708 A | | 3/2007 |
| CN | 101214921 A | | 7/2008 |
| CN | 201161926 A | | 12/2008 |
| CN | 101350411 A | | 1/2009 |
| CN | 101542805 A | | 9/2009 |
| CN | 101837955 A | | 9/2010 |
| CN | 101956634 A | | 1/2011 |
| CN | 105163832 A | | 12/2015 |
| CN | 105271118 A | | 1/2016 |
| CN | 107265403 A | | 3/2020 |
| CN | 111542383 A | | 8/2020 |
| CN | 107697885 B | | 5/2021 |
| DE | 69120740 T2 | | 11/1996 |
| DE | 69219084 T2 | | 7/1997 |
| DE | 69730071 T2 | | 8/2005 |
| DE | 60035418 T2 | | 3/2008 |
| DE | 202007008841 U1 | | 6/2008 |
| EP | 0036268 A1 | | 9/1981 |
| EP | 0570185 A2 | | 11/1993 |
| EP | 0652042 A1 | | 5/1995 |
| EP | 0470822 B1 | | 7/1996 |
| EP | 0546808 B1 | | 4/1997 |
| EP | 0718031 A1 | | 4/1997 |
| EP | 0783919 A1 | | 7/1997 |
| EP | 0957063 A1 | | 11/1999 |
| EP | 1010942 A3 | | 2/2003 |
| EP | 0800852 B1 | | 8/2004 |
| EP | 1272259 B1 | | 10/2004 |
| EP | 1516663 A2 | | 3/2005 |
| EP | 1135822 B1 | | 4/2005 |
| EP | 1279431 B1 | | 4/2005 |
| EP | 1523054 A2 | | 4/2005 |
| EP | 1557395 A2 | | 7/2005 |
| EP | 1679111 A2 | | 7/2006 |
| EP | 0951529 B1 | | 8/2006 |
| EP | 1252678 B1 | | 11/2006 |
| EP | 1189678 B1 | | 7/2007 |
| EP | 1290747 B1 | | 2/2009 |
| EP | 1138096 B1 | | 10/2010 |
| EP | 2359928 A2 | | 8/2011 |
| EP | 2631213 A1 | | 8/2013 |
| EP | 2969132 A1 | | 1/2016 |
| GB | 2355418 A | | 4/2001 |
| GB | 2370241 A | | 6/2002 |
| GB | 2432369 A | | 4/2010 |
| JP | 63021204 A | | 1/1988 |
| JP | 63039622 A | | 2/1988 |
| JP | 63126539 A | | 5/1988 |
| JP | 63252903 A | | 10/1988 |
| JP | 64063019 A | | 3/1989 |
| JP | H6127903 A | | 5/1994 |
| JP | H06290800 A | | 10/1994 |
| JP | H1052621 A | | 2/1998 |
| JP | 11265833 A | | 9/1999 |
| JP | 2001010804 A | | 1/2001 |
| JP | 2001276558 | | 10/2001 |
| JP | 3360766 B2 | | 12/2002 |
| JP | 2002346372 A | | 12/2002 |
| JP | 2003081603 A | | 3/2003 |
| JP | 2003511336 A | | 3/2003 |
| JP | 2003277019 A | | 10/2003 |
| JP | 2003282119 A | | 10/2003 |
| JP | 2003290637 B2 | | 10/2003 |
| JP | 2003530664 A | | 10/2003 |
| JP | 2003334418 A | | 11/2003 |
| JP | 2004071242 A | | 3/2004 |
| JP | 2004525488 A | | 8/2004 |
| JP | 2005067990 A | | 3/2005 |
| JP | 2005154198 A | | 6/2005 |
| JP | 2005296746 A | | 7/2005 |
| JP | 2005520306 A | | 7/2005 |
| JP | 2006012817 A | | 1/2006 |
| JP | 2006019033 A | | 1/2006 |
| JP | 2006040597 A | | 2/2006 |
| JP | 2006503780 A | | 2/2006 |
| JP | 2006137668 A | | 6/2006 |
| JP | 2006523795 A | | 10/2006 |
| JP | 2007095548 A | | 4/2007 |
| JP | 2007099528 A | | 4/2007 |
| JP | 2008518871 A | | 6/2008 |
| JP | 2008171815 A | | 7/2008 |
| JP | 2008528430 A | | 7/2008 |
| JP | 2008536796 A | | 9/2008 |
| JP | 2008253984 A | | 10/2008 |
| JP | 2008285404 A | | 11/2008 |
| JP | 2008308351 A | | 12/2008 |
| JP | 2009000659 A | | 1/2009 |
| JP | 2009509299 A | | 3/2009 |
| JP | 2009173534 A | | 8/2009 |
| JP | 2010010050 A | | 1/2010 |
| JP | 2010013323 A | | 1/2010 |
| JP | 2010111543 A | | 5/2010 |
| JP | 2011057480 A | | 3/2011 |
| JP | 2002293504 A | | 10/2012 |
| JP | 2014520750 A | | 8/2014 |
| JP | 2014517804 A | | 6/2016 |
| JP | 2016516655 A | | 6/2016 |
| JP | 6538764 B2 | | 6/2019 |
| JP | 6975286 B2 | | 12/2021 |
| MX | 381667 A | | 4/2021 |
| TW | 563270 B1 | | 11/2003 |
| TW | 200404739 A | | 4/2004 |
| TW | 200629635 A | | 8/2006 |
| TW | 200740014 A | | 10/2007 |
| TW | 200804177 A | | 1/2008 |
| TW | 201429868 A | | 8/2014 |
| TW | 201733903 A | | 10/2017 |
| TW | 201815663 A | | 5/2018 |
| TW | I700246 A | | 8/2020 |
| TW | I700246 B | | 8/2020 |
| TW | 202045437 A | | 12/2020 |
| WO | 8806489 A1 | | 9/1988 |
| WO | 9919456 A1 | | 4/1999 |

(56) References Cited

FOREIGN PATENT DOCUMENTS

| | | |
|---|---|---|
| WO | 0022690 A1 | 4/2000 |
| WO | 0056425 A1 | 9/2000 |
| WO | 0108247 A1 | 2/2001 |
| WO | 0112311 A1 | 2/2001 |
| WO | 0112539 A1 | 2/2001 |
| WO | 0126174 A1 | 4/2001 |
| WO | 0150541 A1 | 7/2001 |
| WO | 0150542 A1 | 7/2001 |
| WO | 0168514 A2 | 9/2001 |
| WO | 0170376 A1 | 9/2001 |
| WO | 0173879 A1 | 10/2001 |
| WO | 0193362 A1 | 12/2001 |
| WO | 0238265 A1 | 5/2002 |
| WO | 0249128 A2 | 6/2002 |
| WO | 02069428 A1 | 9/2002 |
| WO | 03002244 A1 | 1/2003 |
| WO | 03026776 A1 | 4/2003 |
| WO | 03041188 A2 | 5/2003 |
| WO | 03077331 A2 | 9/2003 |
| WO | 03086964 A1 | 10/2003 |
| WO | 03089128 A1 | 10/2003 |
| WO | 03100900 A1 | 12/2003 |
| WO | 2004038845 A1 | 5/2004 |
| WO | 2004091005 A2 | 10/2004 |
| WO | 2005001955 A2 | 1/2005 |
| WO | 2005091785 A2 | 10/2005 |
| WO | 2005119824 A2 | 12/2005 |
| WO | 2006011619 A1 | 2/2006 |
| WO | 2006033773 A2 | 3/2006 |
| WO | 2006049918 A2 | 5/2006 |
| WO | 2006050335 A2 | 5/2006 |
| WO | 2006081402 A2 | 8/2006 |
| WO | 2006133003 A2 | 12/2006 |
| WO | 2007035467 A2 | 3/2007 |
| WO | 2007037856 A2 | 4/2007 |
| WO | 2007049130 A1 | 5/2007 |
| WO | 2008008279 A2 | 1/2008 |
| WO | 2008033301 A1 | 3/2008 |
| WO | 2008105770 A1 | 9/2008 |
| WO | 2009088962 A1 | 7/2009 |
| WO | 2010033628 A1 | 3/2010 |
| WO | 2010118221 A1 | 10/2010 |
| WO | 2011059446 A1 | 5/2011 |
| WO | 2012067612 A1 | 5/2012 |
| WO | 2012091121 A1 | 7/2012 |
| WO | 2013158343 A1 | 10/2013 |
| WO | 2014099606 A1 | 6/2014 |
| WO | 2014158749 A1 | 10/2014 |
| WO | 2015183426 A1 | 12/2015 |
| WO | 2019136156 A1 | 7/2019 |

OTHER PUBLICATIONS

Office Action prepared by the European Patent Office for EP 14773171.5, dated Jun. 28, 2019, 4 pages.
Office Action prepared by the Chinese Patent Office for CN 201710352484X, dated Jul. 18, 2019, 3 pages.
Hearing Notice for IN 433/KOLNP/2015, dated Jul. 30, 2019, 2 pages.
Office Action prepared by the China National Intellectual Property Administration for CN 201710102421, dated Sep. 16, 2019, 27 pages.
Election/Restriction Requirement prepared by the US Patent and Trademark Office for U.S. Appl. No. 15/862,474, dated Sep. 30, 2019, 6 pages.
Office Action prepared by the US Patent and Trademark Office for U.S. Appl. No. 15/985,175, dated Oct. 10, 2019, 57 pages.
Office Action prepared by the Taiwan Patent Office for TW 107145920, dated Nov. 5, 2019, 21 pages.
Office Action prepared by the US Patent and Trademark Office for U.S. Appl. No. 15/985,175, dated Jan. 29, 2020, 8 pages.
Office Action prepared by the Chinese Patent Office for CN201710102421, dated Apr. 16, 2020, 29 pages.
Examiner's Report prepared by the Canadian Patent Office for CA 2,967,340, dated May 22, 2020, 4 pages.
Office Action prepared by the Mexican Patent Office for MX/a/2015/012252, dated Jul. 23, 2020, 7 pages.
Office Action prepared by the European Patent Office for EP13832056, dated Sep. 3, 2020, 4 pages.
Office Action prepared by the US Patent and Trademark Office for U.S. Appl. No. 16/904,872, dated Sep. 22, 2020, 8 pages.
Office Action prepared by the Chinese Patent Office for CN201710102421, dated Oct. 20, 2020, 32 pages.
First Examination Report prepared by the Indian Patent Office for IN 202037032378, dated Oct. 21, 2020, 7 pages.
Office Action prepared by the US Patent and Trademark Office for U.S. Appl. No. 16/891,477, dated Nov. 6, 2020 6 pages.
Final Office Action prepared by the US Patent and Trademark Office for U.S. Appl. No. 16/904,872, dated Jan. 27, 2021, 11 pages.
First Office Action prepared by the Japanese Patent Office for JP 2020-79526, dated Mar. 15, 2021, 6 pages.
Office Action prepared by the US Patent and Trademark Office for U.S. Appl. No. 16/513,324, dated Jul. 26, 2021, 70 pages.
Office Action prepared by the Japanese Patent Office for JP 2020-537176, dated Aug. 30, 2021, 11 pages.
Extended European Search Report prepared by the European Patent Office for EP19735938.3, dated Sep. 21, 2021, 7 pages.
Office Action prepared by the Chinese Patent Office for CN 201980007152.5, dated Sep. 26, 2021, 26 pages.
Final Office Action prepared by the US Patent and Trademark Office for U.S. Appl. No. 16/513,324, dated Nov. 15, 2021, 12 pages.
International Search Report and Written Opinion prepared by the US Patent and Trademark Office for PCT/US2021/047866, dated Dec. 16, 2021, 11 pages.
Notice of Preliminary Rejection prepared by the Korean Intellectual Property Office, Korean Patent Application No. 10-2020-7022167, dated Jan. 19, 2022, 16 pages.
Decision of Rejection, prepared by the China National Intellectual Property Administration (CNIPA), Chinese Patent Application No. 201980007152.5, dated Mar. 25, 2022, 22 pages.
Examination Report prepared by the Taiwan Intellectual Property Office (TIPO), Taiwan Patent Application No. 110131460, dated May 12, 2022, 38 pages.
Office Action prepared by the US Patent and Trademark Office for U.S. Appl. No. 17/167,555, dated Jun. 10, 2022, 68 pages.
Rejection Report prepared by the Taiwan Intellectual Property Office (TIPO), Taiwan Patent Application No. 110131460, dated Sep. 13, 2022, 9 pages.
International Search Report and Written Opinion prepared by the US Patent and Trademark Office for PCT/US2022/32503, dated Oct. 25, 2022, 17 pages.
Final Office Action prepared by the US Patent and Trademark Office for U.S. Appl. No. 17/167,555, dated Oct. 31, 2022, 10 pages.
Notice of Preliminary Rejection prepared by the Korean Intellectual Property Office, Korean Patent Application No. 10-2022-7033348, dated Nov. 7, 2022, 11 pages.
Office Action prepared by the US Patent and Trademark Office for U.S. Appl. No. 17/348,400 dated Dec. 13, 2022, 8 pages.
Office Action prepared by the Japanese Patent Office for JP2022-3522, dated Dec. 23, 2022, 11 pages.
Office Action prepared by the Taiwan Intellectual Property Office (TIPO), Taiwan Patent Application No. 111120271, Jul. 11, 2023, 43 pages.
Office Action prepared by the Chinese Intellectual Property Office (CNIPA), Chinese Patent Application No. 202211067088X, dated Aug. 10, 2023, 22 pages.
Edlund, David, "Methanol Fuel Cell Systems: Advancing Towards Commercialization", Pan Stanford Publishing Pte. Ltd., Singapore, 2011, 199 pages.
HGS-M Series Hydrogen Generator: Powering Fuel Cells from readily available Methanol, www.hy9.com, Hopkinton, Massachusetts, USA, updated Jun. 20, 2011, 2 pages.
U.S. Receiving Office, International Search Report and Written Opinion for International Application No. PCT/US12/45437, dated Nov. 19, 2012, 12 pages.

(56) References Cited

OTHER PUBLICATIONS

U.S. Receiving Office, International Preliminary Report for PCT Application No. PCT/US2012/045437, dated Jan. 7, 2014, 7 pages.
Taiwan Intellectual Property Office, Examination Report in Taiwanese Patent Application No. 101124209, dated Dec. 19, 2013, 32 pages.
U.S. Receiving Office, International Search Report and Written Opinion for PCT Application No. PCT/US13/56908, dated Jan. 24, 2014, 2 pages.
U.S. Receiving Office, International Search and Written Opinion report for PCT Application No. PCT/US2014/019837, dated Jun. 6, 2014, 8 pages.
Taiwan Intellectual Property Office, Examination Report for Taiwanese Patent Application No. 102131014, dated Dec. 27, 2014, 29 pages.
State Intellectual Property Office of the P.R.C., Office Action for Chinese Patent Application No. 201280039436.0, dated Jan. 27, 2015, 28 pages.
United States Patent and Trademark Office, Office Action for U.S. Appl. No. 13/600,096, dated Feb. 5, 2015, 9 pages.
Japan Patent Office, Office Action for Japanese Patent Application No. 2014-519267, dated Apr. 6, 2015, 13 pages.
Taiwan Intellectual Property Office, Office Action for Taiwanese Patent Application No. 103134184, dated Apr. 30, 2015, 17 pages.
U.S. Patent and Trademark Office, Office Action for U.S. Appl. No. 13/600,096, dated Jun. 1, 2015, 9 pages.
U.S. Patent and Trademark Office, Office Action for U.S. Appl. No. 13/829,766, dated Jun. 26, 2015, 6 pages.
U.S. Patent and Trademark Office, Office Action for U.S. Appl. No. 13/600,096, dated Sep. 11, 2015, 9 pages.
Taiwan Intellectual Property Office, Decision of Rejection for Taiwanese Patent Application No. 102131014, dated Nov. 2, 2015, 15 pages.
Taiwan Intellectual Property Office, Examination Report for Taiwanese Patent Application No. 103108640, dated Nov. 23, 2015, 39 pages.
State Intellectual Property Office of the P.R.C., Office Action for Chinese Patent Application No. 201380052485.2, dated Jan. 12, 2016, 29 pages.
Japan Patent Office, Office Action for Japanese Patent Application No. 2015-529963, dated Jan. 18, 2016, 7 pages.
European Patent Office, Extended Search Report for European Patent Application No. 13832056.9, dated Mar. 18, 2016, 6 pages.
State Intellectual Property Office of the P.R.C., Office Action for Chinese Patent Application No. 2016062901774250, dated Jul. 4, 2016, 18 pages.
State Intellectual Property Office of the P.R.C., Office Action for Chinese Patent Application No. 201380052485.2, dated Jul. 20, 2016, 31 pages.
Decision of Rejection prepared by the Taiwan Intellectual Property Office for Taiwanese Patent Application No. 103108640, dated Aug. 25, 2016, 25 pages.
Japan Patent Office, Office Action for Japanese Patent Application No. 2015-135010, dated Sep. 12, 2016, 15 pages.
U.S. Patent and Trademark Office, Office Action for U.S. Appl. No. 14/594,997, dated Sep. 15, 2016, 85 pages.
Japan Patent Office, Office Action for Japanese Patent Application No. 2016-500545, dated Oct. 3, 2016, 6 pages.
European Patent Office, Supplementary Search Report for European Patent Application No. 14773171.5, dated Oct. 14, 2016, 7 pages.
State Intellectual Property Office of the P.R.C., Office Action for Chinese Patent Application No. 201380052485.2, dated Dec. 29, 2016, 15 pages.
European Patent Office, Extended Search Report for European Patent Application No. 14773171.5, dated Feb. 13, 2017, 13 pages.
European Patent Office, Communication for European Patent Application No. 14773171.5, dated Mar. 2, 2017, 1 page.
Office Action prepared by the Chinese Patent Office for Chinese Patent Application No. 201480015413.5, dated Mar. 9, 2017, 17 pages.
Office Action prepared by the Chinese Patent Office for Chinese Patent Application No. 201510896209.5, dated Mar. 14, 2017, 6 pages.
Office Action prepared by the US Patent and Trademark Office for U.S. Appl. No. 14/961,529, dated Jul. 26, 2017, 79 pages.
Office Action prepared by the Taiwan intellectual Property Office for Taiwanese Patent Application No. 103108640, dated Jul. 27, 2017, 2 pages.
Office Action prepared by the European Patent Office for European Patent Application No. 13832056.9, dated Dec. 19, 2017, 4 pages.
Office Action prepared by the Chinese Patent Office for Chinese Patent Application No. 2015108962095, dated Jan. 4, 2018, 8 pages.
Office Action prepared by the Japanese Patent Office for Japanese Patent Application No. 2017-130918, dated Feb. 26, 2018, 9 pages.
Examination Report prepared by the Indian Patent Office for Indian Patent Application No. 433/KOLNP/2015, dated Feb. 28, 2018, 7 pages.
Office Action prepared by the US Patent and Trademark Office for U.S. Appl. No. 15/483,265, dated May 22, 2018, 56 pages.
Office Action prepared by the European Patent Office for EP 14 773 171.5-1104, dated Jul. 20, 2018, 5 pages.
Office Action prepared by the Japanese Patent Office for JP 2017-130918, dated Jul. 30, 2018, 7 pages.
Office Action prepared by the European Patent Office for EP 13 832 056.9-1101, dated Aug. 21, 2018, 4 pages.
Notice of Reasons for Rejection prepared by the Japanese Patent Office for JP 2017-182239, dated Nov. 12, 2018, 4 pages.
Decision to Reject the Amendments prepared by the Japanese Patent Office for JP 2017-130918, dated Dec. 3, 2018, 6 pages.
Office Action prepared by the State Intellectual Property Office of PR China for CN 201710352484.X, dated Dec. 11, 2018, 14 pages.
International Search Report and Written Opinion prepared by the US Patent and Trademark Office for PCT/US2019/012192, dated Mar. 8, 2019, 11 pages.
Office Action prepared by the US Patent and Trademark Office for U.S. Appl. No. 15/486,755, dated Mar. 18, 2019, 77 pages.
Office Action prepared by the European Patent Office for EP 13 832 056.9, dated Mar. 20, 2019, 5 pages.
Taiwan Intellectual Property Office, Examination Report in Taiwanese Patent Application No. 110131460, dated Mar. 13, 2024, 10 pages.
Japan Patent Office, Office Action for Japanese Patent Application No. 2023-513482, dated Mar. 25, 2024 pp. 9 pages.
State Intellectual Property Office of the P.R.C., Office Action for Chinese Patent Application No. 202180072521.6, dated Mar. 13, 2024, 15 pages.

HYDROGEN PURIFICATION DEVICES

CROSS-REFERENCE TO RELATED APPLICATIONS

This application is a continuation of U.S. patent application Ser. No. 17/412,58, filed Aug. 26, 2021, and entitled "Hydrogen Purification Devices," which claims benefit of U.S. Provisional Application No. 63/071,139 filed Aug. 27, 2020 and entitled "Hydrogen Purification Devices," and which also is a continuation-in-part of U.S. patent application Ser. No. 16/904,872, filed Jun. 18, 2020 and entitled "Hydrogen Purification Devices," and now issued as U.S. Pat. No. 11,103,828, which is a divisional application of U.S. patent application Ser. No. 15/862,474, filed Jan. 4, 2018 and now issued as U.S. Pat. No. 10,717,040 and entitled "Hydrogen Purification Devices," which is a continuation-in-part application of U.S. patent application Ser. No. 15/483,265, filed Apr. 10, 2017 and now issued as U.S. Pat. No. 10,166,506 and entitled "Hydrogen Generation Assemblies and Hydrogen Purification Devices", which is a continuation of U.S. patent application Ser. No. 14/931,585, filed Nov. 3, 2015 and now issued as U.S. Pat. No. 9,616,389, and entitled "Hydrogen Generation Assemblies and Hydrogen Purification Devices", which is a divisional of U.S. patent application Ser. No. 13/829,766, filed Mar. 14, 2013, and now issued at U.S. Pat. No. 9,187,324, and entitled "Hydrogen Generation Assemblies and Hydrogen Purification Devices", which is a continuation-in-part of U.S. patent application Ser. No. 13/600,096, filed Aug. 30, 2012, and entitled "Hydrogen Generation Assemblies" now abandoned. The complete disclosures of the above applications are hereby incorporated by reference for all purposes.

BACKGROUND OF THE DISCLOSURE

A hydrogen generation assembly is an assembly that converts one or more feedstocks into a product stream containing hydrogen gas as a majority component. The feedstocks may include a carbon-containing feedstock and, in some embodiments, also may include water. The feedstocks are delivered to a hydrogen-producing region of the hydrogen generation assembly from a feedstock delivery system, typically with the feedstocks being delivered under pressure and at elevated temperatures. The hydrogen-producing region is often associated with a temperature modulating assembly, such as a heating assembly or cooling assembly, which consumes one or more fuel streams to maintain the hydrogen-producing region within a suitable temperature range for effectively producing hydrogen gas. The hydrogen generation assembly may generate hydrogen gas via any suitable mechanism(s), such as steam reforming, autothermal reforming, pyrolysis, and/or catalytic partial oxidation.

The generated or produced hydrogen gas may, however, have impurities. That gas may be referred to as a mixed gas stream that contains hydrogen gas and other gases. Prior to using the mixed gas stream, it must be purified, such as to remove at least a portion of the other gases. The hydrogen generation assembly may therefore include a hydrogen purification device for increasing the hydrogen purity of the mixed gas stream. The hydrogen purification device may include at least one hydrogen-selective membrane to separate the mixed gas stream into a product stream and a byproduct stream. The product stream contains a greater concentration of hydrogen gas and/or a reduced concentration of one or more of the other gases from the mixed gas stream. Hydrogen purification using one or more hydrogen-selective membranes is a pressure driven separation process in which the one or more hydrogen-selective membranes are contained in a pressure vessel. The mixed gas stream contacts the mixed gas surface of the membrane(s), and the product stream is formed from at least a portion of the mixed gas stream that permeates through the membrane(s). The pressure vessel is typically sealed to prevent gases from entering or leaving the pressure vessel except through defined inlet and outlet ports or conduits.

The product stream may be used in a variety of applications. One such application is energy production, such as in electrochemical fuel cells. An electrochemical fuel cell is a device that converts fuel and an oxidant to electricity, a reaction product, and heat. For example, fuel cells may convert hydrogen and oxygen into water and electricity. In those fuel cells, the hydrogen is the fuel, the oxygen is the oxidant, and the water is a reaction product. Fuel cell stacks include a plurality of fuel cells and may be utilized with a hydrogen generation assembly to provide an energy production assembly.

Examples of hydrogen generation assemblies, hydrogen processing assemblies, and/or components of those assemblies are described in U.S. Pat. Nos. 5,861,137; 6,319,306; 6,494,937; 6,562,111; 7,063,047; 7,306,868; 7,470,293; 7,601,302; 7,632,322; 8,961,627; and U.S. Patent Application Publication Nos. 2006/0090397; 2006/0272212; 2007/0266631; 2007/0274904; 2008/0085434; 2008/0138678; 2008/0230039; and 2010/0064887. The complete disclosures of the above patents and patent application publications are hereby incorporated by reference for all purposes.

DETAILED DESCRIPTION OF THE DISCLOSURE

Figure 1:
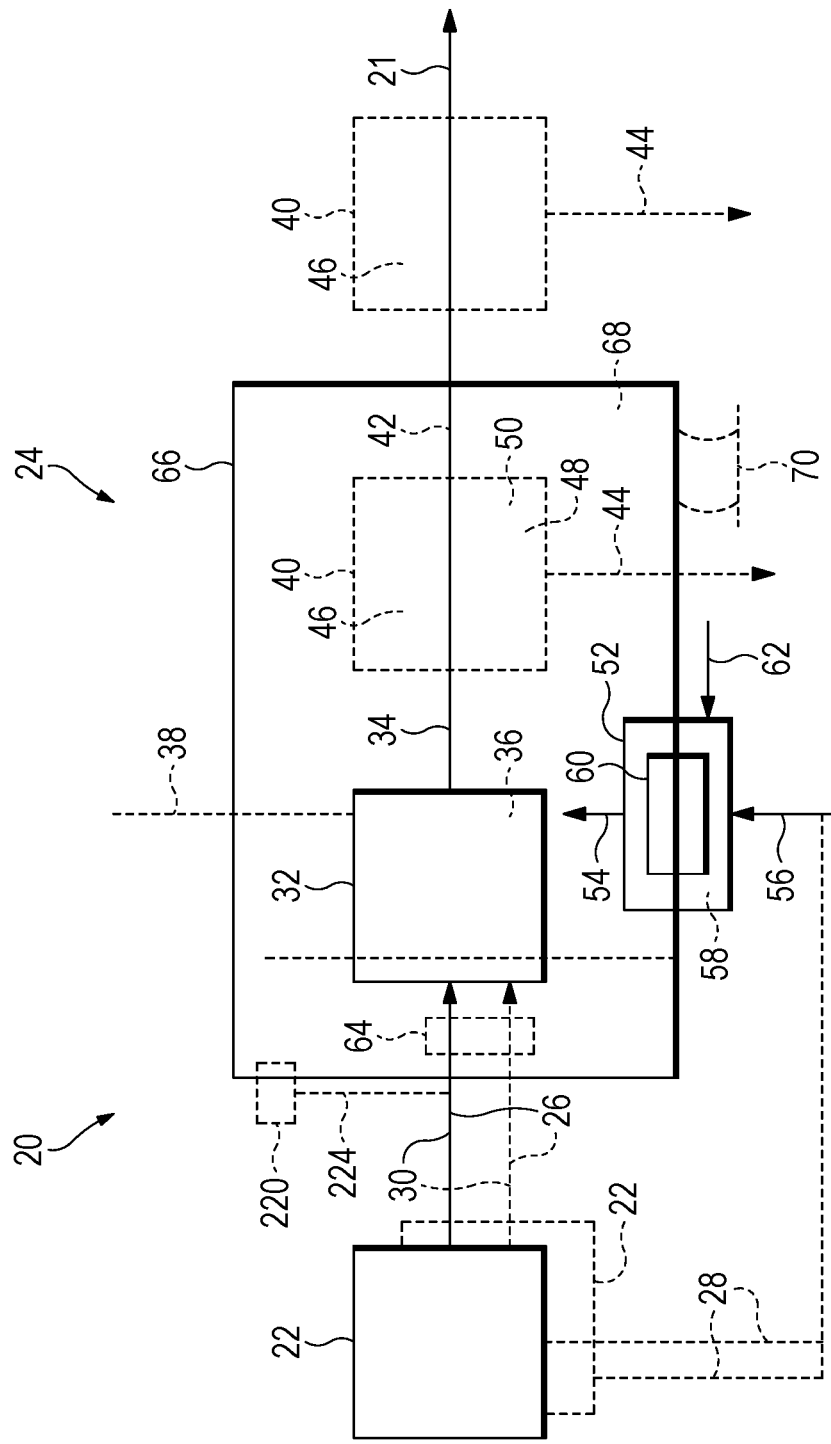
FIG. 1 is a schematic view of an example of a hydrogen generation assembly.

FIG. 1 shows an example of a hydrogen generation assembly 20. Unless specifically excluded hydrogen generation assembly 20 may include one or more components of other hydrogen generation assemblies described in this disclosure. The hydrogen generation assembly may include any suitable structure configured to generate a product hydrogen stream 21. For example, the hydrogen generation assembly may include a feedstock delivery system 22 and a fuel processing assembly 24. The feedstock delivery system may include any suitable structure configured to selectively deliver at least one feed stream 26 to the fuel processing assembly.

In some embodiments, feedstock delivery system 22 may additionally include any suitable structure configured to selectively deliver at least one fuel stream 28 to a burner or other heating assembly of fuel processing assembly 24. In some embodiments, feed stream 26 and fuel stream 28 may be the same stream delivered to different parts of the fuel processing assembly. The feedstock delivery system may include any suitable delivery mechanisms, such as a positive displacement or other suitable pump or mechanism for propelling fluid streams. In some embodiments, feedstock delivery system may be configured to deliver feed stream(s) 26 and/or fuel stream(s) 28 without requiring the use of pumps and/or other electrically powered fluid-delivery mechanisms. Examples of suitable feedstock delivery systems that may be used with hydrogen generation assembly 20 include the feedstock delivery systems described in U.S. Pat. Nos. 7,470,293 and 7,601,302, and U.S. Patent Application Publication No. 2006/0090397. The complete disclosures of the above patents and patent application are hereby incorporated by reference for all purposes.

Feed stream 26 may include at least one hydrogen-production fluid 30, which may include one or more fluids that may be utilized as reactants to produce product hydrogen stream 21. For example, the hydrogen-production fluid may include a carbon-containing feedstock, such as at least one hydrocarbon and/or alcohol. Examples of suitable hydrocarbons include methane, propane, natural gas, diesel, kerosene, gasoline, etc. Examples of suitable alcohols include methanol, ethanol, polyols (such as ethylene glycol and propylene glycol), etc. Additionally, hydrogen-production fluid 30 may include water, such as when the fuel processing assembly generates the product hydrogen stream via steam reforming and/or autothermal reforming. When fuel processing assembly 24 generates the product hydrogen stream via pyrolysis or catalytic partial oxidation, feed stream 26 does not contain water.

In some embodiments, feedstock delivery system 22 may be configured to deliver a hydrogen-production fluid 30 that contains a mixture of water and a carbon-containing feedstock that is miscible with water (such as methanol and/or another water-soluble alcohol). The ratio of water to carbon-containing feedstock in such a fluid stream may vary according to one or more factors, such as the particular carbon-containing feedstock being used, user preferences, design of the fuel processing assembly, mechanism(s) used by the fuel processing assembly to generate the product hydrogen stream etc. For example, the molar ratio of water to carbon may be approximately 1:1 to 3:1. Additionally, mixtures of water and methanol may be delivered at or near a 1:1 molar ratio (37 weight % water, 63 weight % methanol), while mixtures of hydrocarbons or other alcohols may be delivered at a water-to-carbon molar ratio greater than 1:1.

When fuel processing assembly 24 generates product hydrogen stream 21 via reforming, feed stream 26 may include, for example, approximately 25-75 volume % methanol or ethanol (or another suitable water-miscible carbon-containing feedstock) and approximately 25-75 volume % water. For feed streams that at least substantially include methanol and water, those streams may include approximately 50-75 volume % methanol and approximately 25-50 volume % water. Streams containing ethanol or other water-miscible alcohols may contain approximately 25-60 volume % alcohol and approximately 40-75 volume % water. An example of a feed stream for hydrogen generating assembly 20 that utilizes steam reforming or autothermal reforming contains 69 volume % methanol and 31 volume % water.

Although feedstock delivery system 22 is shown to be configured to deliver a single feed stream 26, the feedstock delivery system may be configured to deliver two or more feed streams 26. Those streams may contain the same or different feedstocks and may have different compositions, at least one common component, no common components, or the same compositions. For example, a first feed stream may include a first component, such as a carbon-containing feedstock and a second feed stream may include a second component, such as water. Additionally, although feedstock delivery system 22 may, in some embodiments, be configured to deliver a single fuel stream 28, the feedstock delivery system may be configured to deliver two or more fuel streams. The fuel streams may have different compositions, at least one common component, no common components, or the same compositions. Moreover, the feed and fuel streams may be discharged from the feedstock delivery system in different phases. For example, one of the streams may be a liquid stream while the other is a gas stream. In some embodiments, both streams may be liquid streams, while in other embodiments both streams may be gas streams. Furthermore, although hydrogen generation assembly 20 is shown to include a single feedstock delivery system 22, the hydrogen generation assembly may include two or more feedstock delivery systems 22.

Fuel processing assembly 24 may include a hydrogen-producing region 32 configured to produce an output stream 34 containing hydrogen gas via any suitable hydrogen-producing mechanism(s). The output stream may include hydrogen gas as at least a majority component and may include additional gaseous component(s). Output stream 34 may therefore be referred to as a "mixed gas stream" that contains hydrogen gas as its majority component but which includes other gases.

Hydrogen-producing region 32 may include any suitable catalyst-containing bed or region. When the hydrogen-producing mechanism is steam reforming, the hydrogen-producing region may include a suitable steam reforming catalyst 36 to facilitate production of output stream(s) 34 from feed stream(s) 26 containing a carbon-containing feedstock and water. In such an embodiment, fuel processing assembly 24 may be referred to as a "steam reformer," hydrogen-producing region 32 may be referred to as a "reforming region," and output stream 34 may be referred to as a "reformate stream." The other gases that may be present in the reformate stream may include carbon monoxide, carbon dioxide, methane, steam, and/or unreacted carbon-containing feedstock.

When the hydrogen-producing mechanism is autothermal reforming, hydrogen-producing region 32 may include a suitable autothermal reforming catalyst to facilitate the production of output stream(s) 34 from feed stream(s) 26 containing water and a carbon-containing feedstock in the presence of air. Additionally, fuel processing assembly 24 may include an air delivery assembly 38 configured to deliver air stream(s) to the hydrogen-producing region.

In some embodiments, fuel processing assembly 24 may include a purification (or separation) region 40, which may include any suitable structure configured to produce at least one hydrogen-rich stream 42 from output (or mixed gas) stream 34. Hydrogen-rich stream 42 may include a greater hydrogen concentration than output stream 34 and/or a reduced concentration of one or more other gases (or impurities) that were present in that output stream. Product hydrogen stream 21 includes at least a portion of hydrogen-rich stream 42. Thus, product hydrogen stream 21 and hydrogen-rich stream 42 may be the same stream and have the same composition and flow rates. Alternatively, some of the purified hydrogen gas in hydrogen-rich stream 42 may be stored for later use, such as in a suitable hydrogen storage assembly and/or consumed by the fuel processing assembly. Purification region 40 also may be referred to as a "hydrogen purification device" or a "hydrogen processing assembly."

In some embodiments, purification region 40 may produce at least one byproduct stream 44, which may contain no hydrogen gas or some hydrogen gas. The byproduct stream may be exhausted, sent to a burner assembly and/or other combustion source, used as a heated fluid stream, stored for later use, and/or otherwise utilized, stored, and/or disposed. Additionally, purification region 40 may emit the byproduct stream as a continuous stream responsive to the delivery of output stream 34, or may emit that stream intermittently, such as in a batch process or when the byproduct portion of the output stream is retained at least temporarily in the purification region.

Fuel processing assembly 24 may include one or more purification regions configured to produce one or more byproduct streams containing sufficient amounts of hydrogen gas to be suitable for use as a fuel stream (or a feedstock stream) for a heating assembly for the fuel processing assembly. In some embodiments, the byproduct stream may have sufficient fuel value or hydrogen content to enable a heating assembly to maintain the hydrogen-producing region at a desired operating temperature or within a selected range of temperatures. For example, the byproduct stream may include hydrogen gas, such as 10-30 volume % hydrogen gas, 15-25 volume % hydrogen gas, 20-30 volume % hydrogen gas, at least 10 or 15 volume % hydrogen gas, at least 20 volume % hydrogen gas, etc.

Purification region 40 may include any suitable structure configured to enrich (and/or increase) the concentration of at least one component of output stream 21. In most applications, hydrogen-rich stream 42 will have a greater hydrogen concentration than output stream (or mixed gas stream) 34. The hydrogen-rich stream also may have a reduced concentration of one or more non-hydrogen components that were present in output stream 34 with the hydrogen concentration of the hydrogen-rich stream being more, the same, or less than the output stream. For example, in conventional fuel cell systems, carbon monoxide may damage a fuel cell stack if it is present in even a few parts per million, while other non-hydrogen components that may be present in output stream 34, such as water, will not damage the stack even if present in much greater concentrations. Therefore, in such an application, the purification region may not increase the overall hydrogen concentration but will reduce the concentration of one or more non-hydrogen components that are harmful, or potentially harmful, to the desired application for the product hydrogen stream.

Examples of suitable devices for purification region 40 include one or more hydrogen-selective membranes 46, chemical carbon monoxide removal assemblies 48, and/or pressure swing adsorption (PSA) systems 50. Purification region 40 may include more than one type of purification device and the devices may have the same or different structures and/or operate by the same or different mechanism(s). Fuel processing assembly 24 may include at least one restrictive orifice and/or other flow restrictor downstream of the purification region(s), such as associated with one or more product hydrogen stream(s), hydrogen-rich stream(s), and/or byproduct stream(s).

Hydrogen-selective membranes 46 are permeable to hydrogen gas, but are at least substantially (if not completely) impermeable to other components of output stream 34. Membranes 46 may be formed of any hydrogen-permeable material suitable for use in the operating environment and parameters in which purification region 40 is operated. Examples of suitable materials for membranes 46 include palladium and palladium alloys, and especially thin films of such metals and metal alloys. Palladium alloys have proven particularly effective, especially palladium with 35 weight % to 45 weight % copper. A palladium-copper alloy that contains approximately 40 weight % copper has proven particularly effective, although other relative concentrations and components may be used. Three other especially effective alloys are palladium with 2 weight % to 20 weight % gold, especially palladium with 5 weight % gold; palladium with 3 weight % to 10 weight % indium plus 0 weight % to 10 weight % ruthenium, especially palladium with 6 weight % indium plus 0.5 weight % ruthenium; and palladium with 20 weight % to 30 weight % silver. When palladium and palladium alloys are used, hydrogen-selective membranes 46 may sometimes be referred to as "foils." Typical thickness of hydrogen-permeable metal foils is less than 25 microns (micrometers), preferably less than or equal to 15 microns, and most preferably between 5 and 12 microns. The foils may be any suitable dimensions, such as 110 mm by 270 mm.

Chemical carbon monoxide removal assemblies 48 are devices that chemically react carbon monoxide and/or other undesirable components of output stream 34 to form other compositions that are not as potentially harmful. Examples of chemical carbon monoxide removal assemblies include water-gas shift reactors that are configured to produce hydrogen gas and carbon dioxide from water and carbon monoxide, partial oxidation reactors that are configured to convert carbon monoxide and oxygen (usually from air) into carbon dioxide, and methanation reactors that are configured to convert carbon monoxide and hydrogen to methane and water. Fuel processing assembly 24 may include more than one type and/or number of chemical removal assemblies 48.

Pressure swing adsorption (PSA) is a chemical process in which gaseous impurities are removed from output stream 34 based on the principle that certain gases, under the proper conditions of temperature and pressure, will be adsorbed onto an adsorbent material more strongly than other gases. Typically, the non-hydrogen impurities are adsorbed and removed from output stream 34. Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites. PSA system 50 also provides an example of a device for use in purification region 40 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 40 is shown within fuel processing assembly 24. The purification region may alternatively be separately located downstream from the fuel processing assembly, as is schematically illustrated in dash-dot lines in FIG. 1. Purification region 40 also may include portions within and external to the fuel processing assembly.

Fuel processing assembly 24 also may include a temperature modulating assembly in the form of a heating assembly 52. The heating assembly may be configured to produce at least one heated exhaust stream (or combustion stream) 54 from at least one heating fuel stream 28, typically as combusted in the presence of air. Heated exhaust stream 54 is schematically illustrated in FIG. 1 as heating hydrogen-producing region 32. Heating assembly 52 may include any suitable structure configured to generate the heated exhaust stream, such as a burner or combustion catalyst in which a fuel is combusted with air to produce the heated exhaust stream. The heating assembly may include an ignitor or ignition source 58 that is configured to initiate the combustion of fuel. Examples of suitable ignition sources include one or more spark plugs, glow plugs, combustion catalyst, pilot lights, piezoelectric ignitors, spark igniters, hot surface igniters, etc.

In some embodiments, heating assembly 52 may include a burner assembly 60 and may be referred to as a combustion-based, or combustion-driven, heating assembly. In a combustion-based heating assembly, heating assembly 52 may be configured to receive at least one fuel stream 28 and to combust the fuel stream in the presence of air to provide a hot combustion stream 54 that may be used to heat at least the hydrogen-producing region of the fuel processing assembly. Air may be delivered to the heating assembly via a variety of mechanisms. For example, an air stream 62 may be delivered to the heating assembly as a separate stream, as shown in FIG. 1. Alternatively, or additionally, air stream 62 may be delivered to the heating assembly with at least one of the fuel streams 28 for heating assembly 52 and/or drawn from the environment within which the heating assembly is utilized.

Combustion stream 54 may additionally, or alternatively, be used to heat other portions of the fuel processing assembly and/or fuel cell systems with which the heating assembly is used. Additionally, other configuration and types of heating assemblies 52 may be used. For example, heating assembly 52 may be an electrically powered heating assembly that is configured to heat at least hydrogen-producing region 32 of fuel processing assembly 24 by generating heat using at least one heating element, such as a resistive heating element. In those embodiments, heating assembly 52 may not receive and combust a combustible fuel stream to heat the hydrogen-producing region to a suitable hydrogen-producing temperature. Examples of heating assemblies are disclosed in U.S. Pat. No. 7,632,322, the complete disclosure of which is hereby incorporated by reference for all purposes.

Heating assembly 52 may be housed in a common shell or housing with the hydrogen-producing region and/or separation region (as further discussed below). The heating assembly may be separately positioned relative to hydrogen-producing region 32 but in thermal and/or fluid communication with that region to provide the desired heating of at least the hydrogen-producing region. Heating assembly 52 may be located partially or completely within the common shell, and/or at least a portion (or all) of the heating assembly may be located external that shell. When the heating assembly is located external the shell, the hot combustion gases from burner assembly 60 may be delivered via suitable heat transfer conduits to one or more components within the shell.

The heating assembly also may be configured to heat feedstock delivery system 22, the feedstock supply streams, hydrogen-producing region 32, purification (or separation) region 40, or any suitable combination of those systems, streams, and regions. Heating of the feedstock supply streams may include vaporizing liquid reactant streams or components of the hydrogen-production fluid used to produce hydrogen gas in the hydrogen-producing region. In that embodiment, fuel processing assembly 24 may be described as including a vaporization region 64. The heating assembly may additionally be configured to heat other components of the hydrogen generation assembly. For example, the heated exhaust stream may be configured to heat a pressure vessel and/or other canister containing the heating fuel and/or the hydrogen-production fluid that forms at least portions of feed stream 26 and fuel stream 28.

Heating assembly 52 may achieve and/or maintain in hydrogen-producing region 32 any suitable temperatures. Steam reformers typically operate at temperatures in the range of 200° C. and 900° C. However, temperatures outside this range are within the scope of this disclosure. When the carbon-containing feedstock is methanol, the steam reforming reaction will typically operate in a temperature range of approximately 200-500° C. Example subsets of that range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Example subsets of that range include 750-850° C., 725-825° C., 650-750° C., 700-800° C., 700-900° C., 500-800° C., 400-600° C., and 600-800° C. Hydrogen-producing region 32 may include two or more zones, or portions, each of which may be operated at the same or at different temperatures. For example, when the hydrogen-production fluid includes a hydrocarbon, hydrogen-producing region 32 may include two different hydrogen-producing portions, or regions, with one operating at a lower temperature than the other to provide a pre-reforming region. In those embodiments, the fuel processing assembly may also be referred to as including two or more hydrogen-producing regions.

Fuel stream 28 may include any combustible liquid(s) and/or gas(es) that are suitable for being consumed by heating assembly 52 to provide the desired heat output. Some fuel streams may be gases when delivered and combusted by heating assembly 52, while others may be delivered to the heating assembly as a liquid stream. Examples of suitable heating fuels for fuel streams 28 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. Yet other examples include hydrogen and carbon monoxide. In embodiments of hydrogen generation assembly 20 that include a temperature modulating assembly in the form of a cooling assembly instead of a heating assembly (such as may be used when an exothermic hydrogen-generating process—e.g., partial oxidation—is utilized instead of an endothermic process such as steam reforming), the feedstock delivery system may be configured to supply a fuel or coolant stream to the assembly. Any suitable fuel or coolant fluid may be used.

Fuel processing assembly 24 may additionally include a shell or housing 66 in which at least hydrogen-producing region 32 is contained, as shown in FIG. 1. In some embodiments, vaporization region 64 and/or purification region 40 may additionally be contained within the shell. Shell 66 may enable components of the steam reformer or other fuel processing mechanism to be moved as a unit. The shell also may protect components of the fuel processing assembly from damage by providing a protective enclosure and/or may reduce the heating demand of the fuel processing assembly because components may be heated as a unit. Shell 66 may include insulating material 68, such as a solid insulating material, blanket insulating material, and/or an air-filled cavity. The insulating material may be internal the shell, external the shell, or both. When the insulating material is external a shell, fuel processing assembly 24 may further include an outer cover or jacket 70 external the insulation, as schematically illustrated in FIG. 1. The fuel processing assembly may include a different shell that includes additional components of the fuel processing assembly, such as feedstock delivery system 22 and/or other components.

One or more components of fuel processing assembly 24 may either extend beyond the shell or be located external the shell. For example, purification region 40 may be located external shell 66, such as being spaced-away from the shell but in fluid communication by suitable fluid-transfer conduits. As another example, a portion of hydrogen-producing region 32 (such as portions of one or more reforming catalyst beds) may extend beyond the shell, such as indicated schematically with a dashed line representing an alternative shell configuration in FIG. 1. Examples of suitable hydrogen generation assemblies and its components are disclosed in U.S. Pat. Nos. 5,861,137; and 6,221,117, the complete disclosures of which are hereby incorporated by reference for all purposes.

Figure 2:
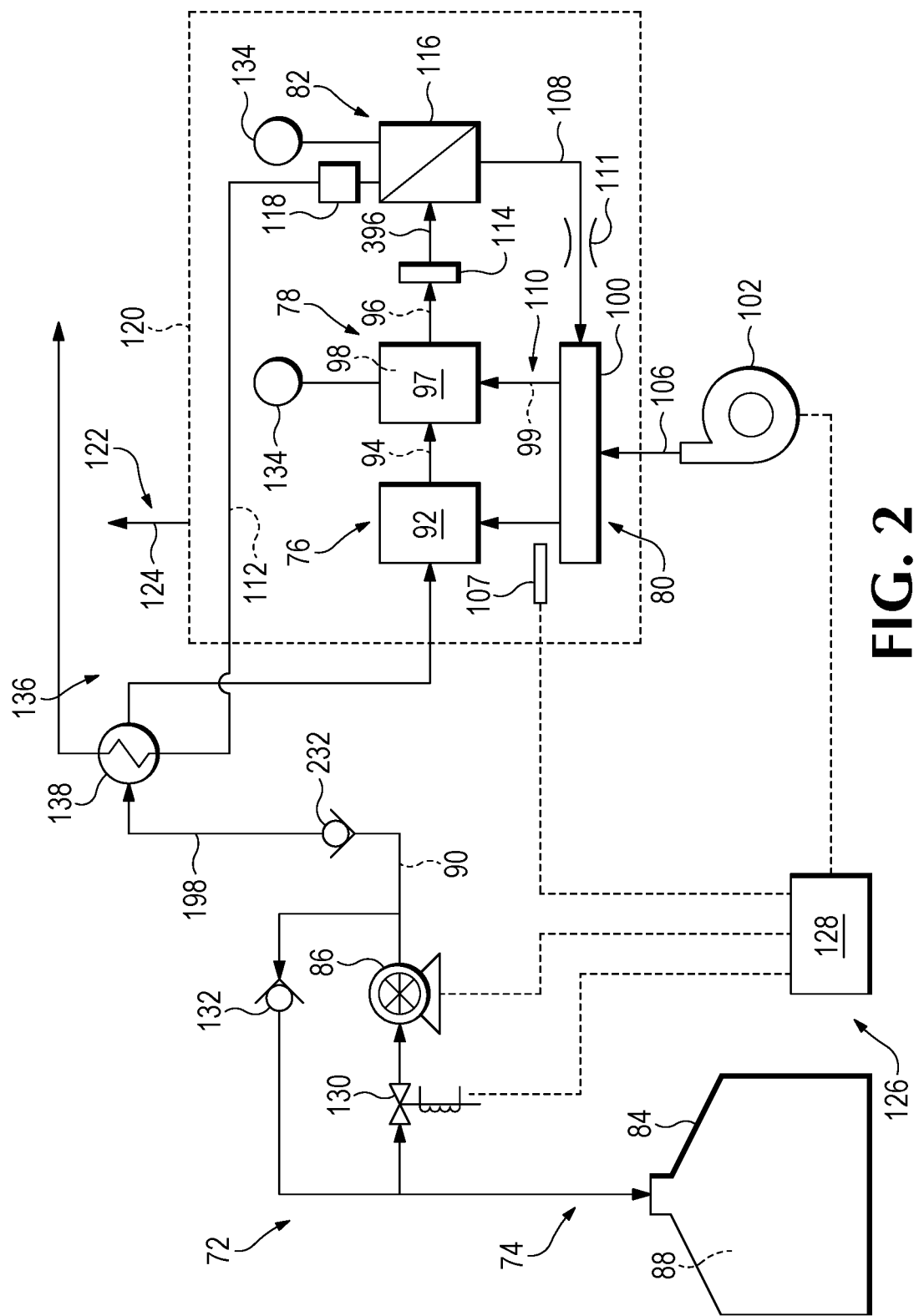
FIG. 2 is a schematic view of an example of the hydrogen generation assembly of FIG. 1.

Another example of hydrogen generation assembly 20 is shown in FIG. 2, and is generally indicated at 72. Unless specifically excluded, hydrogen generation assembly 72 may include one or more components of hydrogen generation assembly 20. Hydrogen-generation assembly 72 may include a feedstock delivery system 74, a vaporization region 76, a hydrogen-producing region 78, and a heating assembly 80, as shown in FIG. 2. In some embodiments, hydrogen generation assembly 20 also may include a purification region 82.

The feedstock delivery system may include any suitable structure configured to deliver one or more feed and/or fuel streams to one or more other components of the hydrogen-generation assembly. For example, feedstock delivery system may include a feedstock tank (or container) 84 and a pump 86. The feedstock tank may contain any suitable hydrogen-production fluid 88, such as water and a carbon-containing feedstock (e.g., a methanol/water mixture). Pump 86 may have any suitable structure configured to deliver the hydrogen-production fluid, which may be in the form of at least one liquid-containing feed stream 90 that includes water and a carbon-containing feedstock, to vaporization region 76 and/or hydrogen-producing region 78.

Vaporization region 76 may include any suitable structure configured to receive and vaporize at least a portion of a liquid-containing feed stream, such as liquid-containing feed stream 90. For example, vaporization region 76 may include a vaporizer 92 configured to at least partially transform liquid-containing feed stream 90 into one or more vapor feed streams 94. The vapor feed streams may, in some embodiments, include liquid. An example of a suitable vaporizer is a coiled tube vaporizer, such as a coiled stainless steel tube.

Hydrogen-producing region 78 may include any suitable structure configured to receive one or more feed streams, such as vapor feed stream(s) 94 from the vaporization region, to produce one or more output streams 96 containing hydrogen gas as a majority component and other gases. The hydrogen-producing region may produce the output stream via any suitable mechanism(s). For example, hydrogen-producing region 78 may generate output stream(s) 96 via a steam reforming reaction. In that example, hydrogen-producing region 78 may include a steam reforming region 97 with a reforming catalyst 98 configured to facilitate and/or promote the steam reforming reaction. When hydrogen-producing region 78 generates output stream(s) 96 via a steam reforming reaction, hydrogen generation assembly 72 may be referred to as a "steam reforming hydrogen generation assembly" and output stream 96 may be referred to as a "reformate stream."

Heating assembly 80 may include any suitable structure configured to produce at least one heated exhaust stream 99 for heating one or more other components of the hydrogen generation assembly 72. For example, the heating assembly may heat the vaporization region to any suitable temperature(s), such as at least a minimum vaporization temperature or the temperature in which at least a portion of the liquid-containing feed stream is vaporized to form the vapor feed stream. Additionally, or alternatively, heating assembly 80 may heat the hydrogen-producing region to any suitable temperature(s), such as at least a minimum hydrogen-producing temperature or the temperature in which at least a portion of the vapor feed stream is reacted to produce hydrogen gas to form the output stream. The heating assembly may be in thermal communication with one or more components of the hydrogen generation assembly, such as the vaporization region and/or hydrogen-producing region.

The heating assembly may include a burner assembly 100, at least one air blower 102, and an igniter assembly 104, as shown in FIG. 2. The burner assembly may include any suitable structure configured to receive at least one air stream 106 and at least one fuel stream 108 and to combust the at least one fuel stream within a combustion region 110 to produce heated exhaust stream 99. The fuel stream may be provided by feedstock delivery system 74 and/or purification region 82. The combustion region may be contained within an enclosure of the hydrogen generation assembly. Air blower 102 may include any suitable structure configured to generate air stream(s) 106. Igniter assembly 104 may include any suitable structure configured to ignite fuel stream(s) 108.

Purification region 82 may include any suitable structure configured to produce at least one hydrogen-rich stream 112, which may include a greater hydrogen concentration than output stream 96 and/or a reduced concentration of one or more other gases (or impurities) that were present in that output stream. The purification region may produce at least one byproduct stream or fuel stream 108, which may be sent to burner assembly 100 and used as a fuel stream for that assembly, as shown in FIG. 2. Purification region 82 may include a flow restricting orifice 111, a filter assembly 114, a membrane assembly 116, and a methanation reactor assembly 118. The filter assembly (such as one or more hot gas filters) may be configured to remove impurities from output stream 96 prior to the hydrogen purification membrane assembly.

Membrane assembly 116 may include any suitable structure configured to receive output or mixed gas stream(s) 96 that contains hydrogen gas and other gases, and to generate permeate or hydrogen-rich stream(s) 112 containing a greater concentration of hydrogen gas and/or a lower concentration of other gases than the mixed gas stream. Membrane assembly 116 may incorporate hydrogen-permeable (or hydrogen-selective) membranes that are planar or tubular, and more than one hydrogen-permeable membrane may be incorporated into membrane assembly 116. The permeate stream(s) may be used for any suitable applications, such as for one or more fuel cells. In some embodiments, the membrane assembly may generate a byproduct or fuel stream 108 that includes at least a substantial portion of the other gases. Methanation reactor assembly 118 may include any suitable structure configured to convert carbon monoxide and hydrogen to methane and water. Although purification region 82 is shown to include flow restricting orifice 111, filter assembly 114, membrane assembly 116, and methanation reactor assembly 118, the purification region may have less than all of those assemblies, and/or may alternatively, or additionally, include one or more other components configured to purify output stream 96. For example, purification region 82 may include only membrane assembly 116.

In some embodiments, hydrogen generation assembly 72 may include a shell or housing 120 which may at least partially contain one or more other components of that assembly. For example, shell 120 may at least partially contain vaporization region 76, hydrogen-producing region 78, heating assembly 80, and/or purification region 82, as shown in FIG. 2. Shell 120 may include one or more exhaust ports 122 configured to discharge at least one combustion exhaust stream 124 produced by heating assembly 80.

Hydrogen generation assembly 72 may, in some embodiments, include a control system 126, which may include any suitable structure configured to control operation of hydrogen generation assembly 72. For example, control system 126 may include a control assembly 128, at least one valve 130, at least one pressure relief valve 132, and one or more temperature measurement devices 134. Control assembly 128 may detect temperatures in the hydrogen-producing region and/or purification regions via the temperature measurement device 134, which may include one or more thermocouples and/or other suitable devices. Based on the detected temperatures, the control assembly and/or an operator of the control system may adjust delivery of feed stream to vaporization region 76 and/or hydrogen-producing region 78 via valve(s) 130 and pump(s) 86. Valve(s) 130 may include a solenoid valve and/or any suitable valve(s). Pressure relief valve(s) 132 may be configured to ensure that excess pressure in the system is relieved.

In some embodiments, hydrogen generation assembly 72 may include a heat exchange assembly 136, which may include one or more heat exchangers 138 configured to transfer heat from one portion of the hydrogen generation assembly to another portion. For example, heat exchange assembly 136 may transfer heat from hydrogen-rich stream 112 to feed stream 90 to raise the temperature of the feed stream prior to entering vaporization region 76, as well as to cool hydrogen-rich stream 112.

Figure 3:
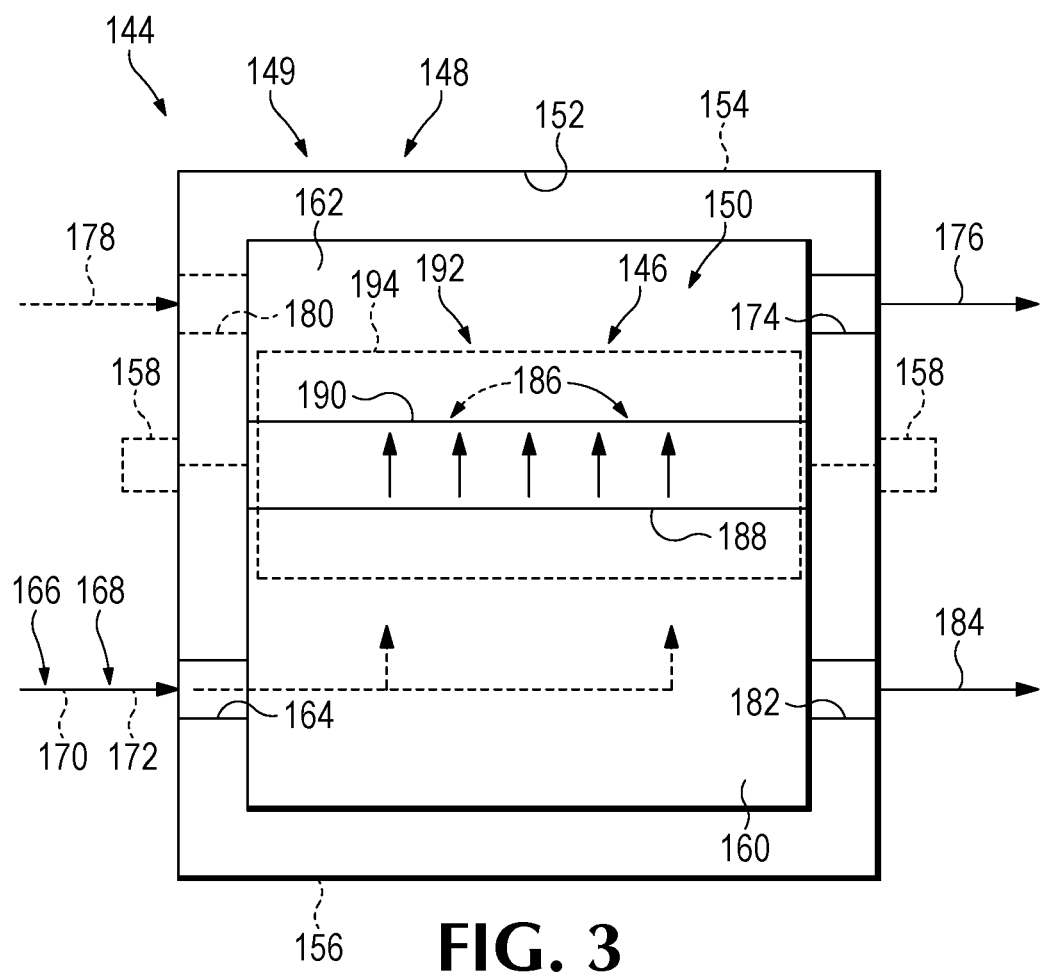
FIG. 3 is a schematic view of a hydrogen purification device of the hydrogen generation assembly of FIG. 1.

An example of a purification region 40 (or hydrogen purification device) of hydrogen generation assembly 20 of FIG. 1 is generally indicated at 144 in FIG. 3. Unless specifically excluded, the hydrogen purification device may include one or more components of the other purification regions described in this disclosure. Hydrogen purification device 40 may include a hydrogen-separation region 146 and an enclosure 148. The enclosure may define an internal volume 150 having an internal perimeter 152. Enclosure 148 may include at least a first portion 154 and a second portion 156 coupled together to form a body 149 in the form of a sealed pressure vessel that may include defined input and output ports. Those ports may define fluid paths by which gases and other fluids are delivered into and removed from the enclosure's internal volume.

First and second portions 154 and 156 may be coupled together using any suitable retention mechanism or structure 158. Examples of suitable retention structures include welds and/or bolts. Examples of seals that may be used to provide a fluid-tight interface between the first and second portions may include gaskets and/or welds. Additionally, or alternatively, first and second portions 154 and 156 may be secured together so that at least a predetermined amount of compression is applied to various components that define the hydrogen-separation region within the enclosure and/or other components that may be incorporated into a hydrogen generation assembly. The applied compression may ensure that various components are maintained in appropriate positions within the enclosure. Additionally, or alternatively, the compression applied to the various components that define the hydrogen-separation region and/or other components may provide fluid-tight interfaces between the various components that define the hydrogen-separation region, various other components, and/or between the components that define the hydrogen-separation region and other components.

Enclosure 148 may include a mixed gas region 160 and a permeate region 162, as shown in FIG. 3. The mixed gas and permeate region may be separated by hydrogen-separation region 146. At least one input port 164 may be provided, through which a fluid stream 166 is delivered to the enclosure. Fluid stream 166 may be a mixed gas stream 168 that contains hydrogen gas 170 and other gases 172 that are delivered to mixed gas region 160. Hydrogen gas may be a majority component of the mixed gas stream. Hydrogen-separation region 146 may extend between mixed gas region 160 and permeate region 162 so that gas in the mixed gas region must pass through the hydrogen-separation region in order to enter the permeate region. The gas may, for example, be required to pass through at least one hydrogen-selective membrane as discussed further below. The permeate and mixed gas regions may be of any suitable relative size within the enclosure.

Enclosure 148 also may include at least one product output port 174 through which a permeate stream 176 may be received and removed from permeate region 162. The permeate stream may contain at least one of a greater concentration of hydrogen gas and a lower concentration of other gases than the mixed gas stream. Permeate stream 176 may, in some embodiments, include at least initially a carrier, or sweep, gas component, such as may be delivered as a sweep gas stream 178 through a sweep gas port 180 that is in fluid communication with the permeate region. The enclosure also may include at least one byproduct output port 182 through which a byproduct stream 184 containing at least one of a substantial portion of other gases 172 and a reduced concentration of hydrogen gas 170 (relative to the mixed gas stream) is removed from the mixed gas region.

Hydrogen-separation region 146 may include at least one hydrogen-selective membrane 186 having a first or mixed gas surface 188, which is oriented for contact by mixed gas stream 168, and a second or permeate surface 190, which is generally opposed to surface 188. Mixed gas stream 168 may be delivered to the mixed gas region of the enclosure so that it comes into contact with the mixed gas surface of the one or more hydrogen-selective membranes. Permeate stream 176 may be formed from at least a portion of the mixed gas stream that passes through the hydrogen-separation region to permeate region 162. Byproduct stream 184 may be formed from at least a portion of the mixed gas stream that does not pass through the hydrogen-separation region. In some embodiments, byproduct stream 184 may contain a portion of the hydrogen gas present in the mixed gas stream. The hydrogen-separation region also may be configured to trap or otherwise retain at least a portion of the other gases, which may then be removed as a byproduct stream as the separation region is replaced, regenerated, or otherwise recharged.

In FIG. 3, streams 166, 176, 178, and/or 184 may include more than one actual stream flowing into or out of hydrogen purification device 144. For example, the hydrogen purification device may receive a plurality of mixed gas streams 168, a single mixed gas stream 168 that is divided into two or more streams prior to contacting hydrogen-separation region 146, a single stream that is delivered into internal volume 150, etc. Thus, enclosure 148 may include more than one input port 164, product output port 174, sweep gas port 180, and/or byproduct output port 182.

The hydrogen-selective membranes may be formed of any hydrogen-permeable material suitable for use in the operating environment and parameters in which the hydrogen purification device is operated. Examples of hydrogen purification devices are disclosed in U.S. Pat. Nos. 5,997,594 and 6,537,352, the complete disclosures of which are hereby incorporated by reference for all purposes. In some embodiments, the hydrogen-selective membranes may be formed from at least one of palladium and a palladium alloy. Examples of palladium alloys include alloys of palladium with copper, silver, and/or gold. Examples of various membranes, membrane configuration, and methods for preparing membranes and membrane configurations are disclosed in U.S. Pat. Nos. 6,152,995; 6,221,117; 6,319,306; and 6,537,352, the complete disclosures of which are hereby incorporated by reference for all purposes.

In some embodiments, a plurality of spaced-apart hydrogen-selective membranes 186 may be used in a hydrogen-separation region to form at least a portion of a hydrogen-separation assembly 192. When present, the plurality of membranes may collectively define one or more membrane assemblies 194. In such embodiments, the hydrogen-separation assembly may generally extend from first portion 154 to second portion 156. Thus, the first and second portions may effectively compress the hydrogen-separation assembly. In some embodiments, enclosure 148 may additionally, or alternatively, include end plates (or end frames) coupled to opposite sides of a body portion. In such embodiments, the end plates may effectively compress the hydrogen-separation assembly (and other components that may be housed within the enclosure) between the pair of opposing end plates.

Hydrogen purification using one or more hydrogen-selective membranes is typically a pressure-driven separation process in which the mixed gas stream is delivered into contact with the mixed gas surface of the membranes at a higher pressure than the gases in the permeate region of the hydrogen-separation region. The hydrogen-separation region may, in some embodiments, be heated via any suitable mechanism to an elevated temperature when the hydrogen-separation region is utilized to separate the mixed gas stream into the permeate and byproduct streams. Examples of suitable operating temperatures for hydrogen purification using palladium and palladium alloy membranes include temperatures of at least 275° C., temperatures of at least 325° C., temperatures of at least 350° C., temperatures in the range of 275-500° C., temperatures in the range of 275-375° C., temperatures in the range of 300-450° C., temperatures in the range of 350-450° C., etc.

Figure 4:
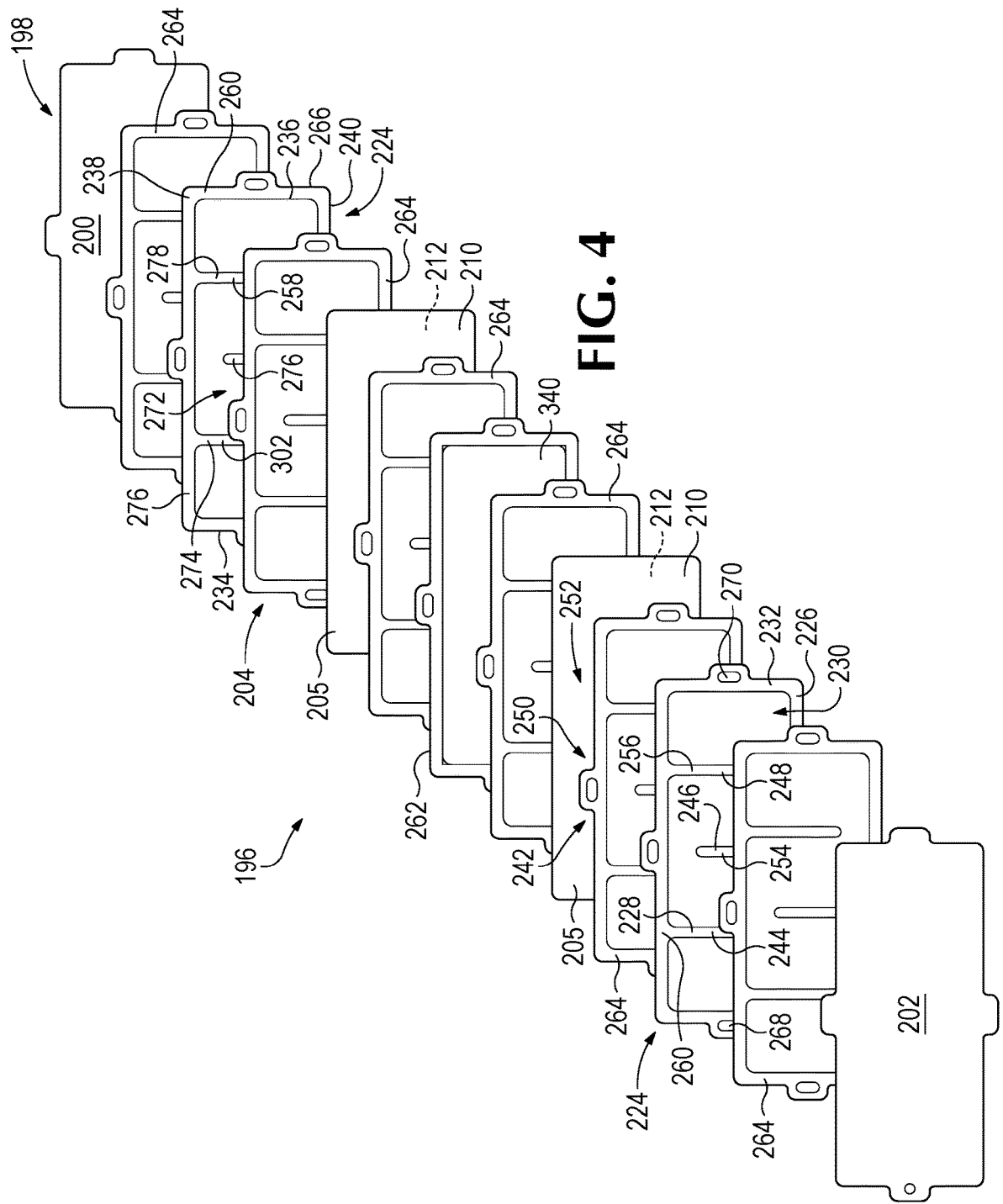
FIG. 4 is an exploded isometric view of an example of a hydrogen purification device of FIG. 3.

An example of a hydrogen purification device 144 is generally indicated at 196 in FIG. 4. Unless specifically excluded, hydrogen purification device 196 may include one or more components of other hydrogen purification devices and/or purification regions described in this disclosure. Hydrogen purification device 196 may include a shell or enclosure 198, which may include a first end plate or end frame 200 and a second end plate or end frame 202. The first and second end plates may be configured to be secured and/or compressed together to define a sealed pressure vessel having an interior compartment 204 in which the hydrogen-separation region is supported. The first and second end plates may include input, output, sweep gas, and byproduct ports (not shown) similar to hydrogen purification device 144.

Figure 5:
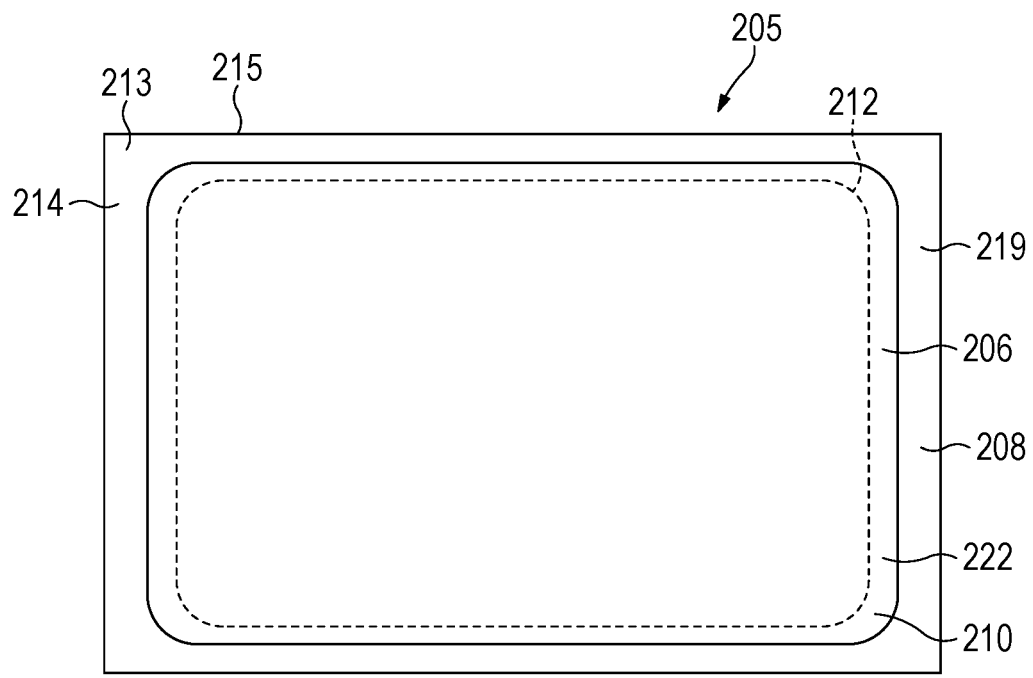
FIG. 5 is a top view of an example of a foil-microscreen assembly of the hydrogen purification device of FIG. 3.

Hydrogen purification device 196 also may include at least one foil-microscreen assembly 205, which may be disposed between and/or secured to the first and second end plates. The foil-microscreen assembly may include at least one hydrogen-selective membrane 206 and at least one microscreen structure 208, as shown in FIG. 5. The hydrogen-selective membrane may be configured to receive at least part of the mixed gas stream from the input port and to separate the mixed gas stream into at least part of the permeate stream and at least part of the byproduct stream. Hydrogen-selective membrane 206 may include a feed side 210 and a permeate side 212. At least part of the permeate stream is formed from the portion of the mixed gas stream that passes from the feed side to the permeate side, with the remaining portion of the mixed gas stream, which remains on the feed side, forms at least part of the byproduct stream.

One or more of the hydrogen-selective membranes may be metallurgically bonded to microscreen structure 208. For example, the permeate side of the hydrogen-selective membrane(s) may be metallurgically bonded to the microscreen structure. In some embodiments, one or more of hydrogen-selective membranes 206 (and/or the permeate side of those membrane(s)) may be diffusion bonded to the microscreen structure to form a solid-state diffusion bond between the membrane(s) and the microscreen structure. For example, the permeate side of the membrane(s) and the microscreen structure may be brought in contact with each other and exposed to elevated temperature and/or elevated pressure to allow the surfaces of the membrane(s) and the microscreen structure to intersperse themselves over time.

In some embodiments, the microscreen structure may be coated with a thin layer of a metal or intermediate bonding layer that aids in the diffusion bonding. For example, a thin coating of nickel, copper, silver, gold, or other metal that is amenable to solid-state diffusion bonding but does not (1) melt and enter the liquid phase at less than or equal to 700 QC and (2) form a low-melting alloy at less than or equal to 700 QC upon diffusion into the hydrogen-selective membrane(s). The thin metal layer may be applied to the microscreen structure via a suitable deposition process (e.g., electrochemical plating, vapor deposition, sputtering, etc.) of a thin coating of the intermediate bonding layer onto the surface of the microscreen structure that will be in contact with the hydrogen-selective membrane. In some embodiments, foil-microscreen assembly 205 includes only the hydrogen-selective membrane(s) and the microscreen structure(s) (with or without the above coating) and without any other frames, gaskets, components, and/or structures attached, bonded, and/or metallurgically bonded to the either or both of the hydrogen-selective membrane(s) and/or the microscreen structure(s). In other embodiments, the hydrogen-selective membrane(s) may be secured to at least one membrane frame (not shown), which may then be secured to the first and second end frames.

Figure 6:
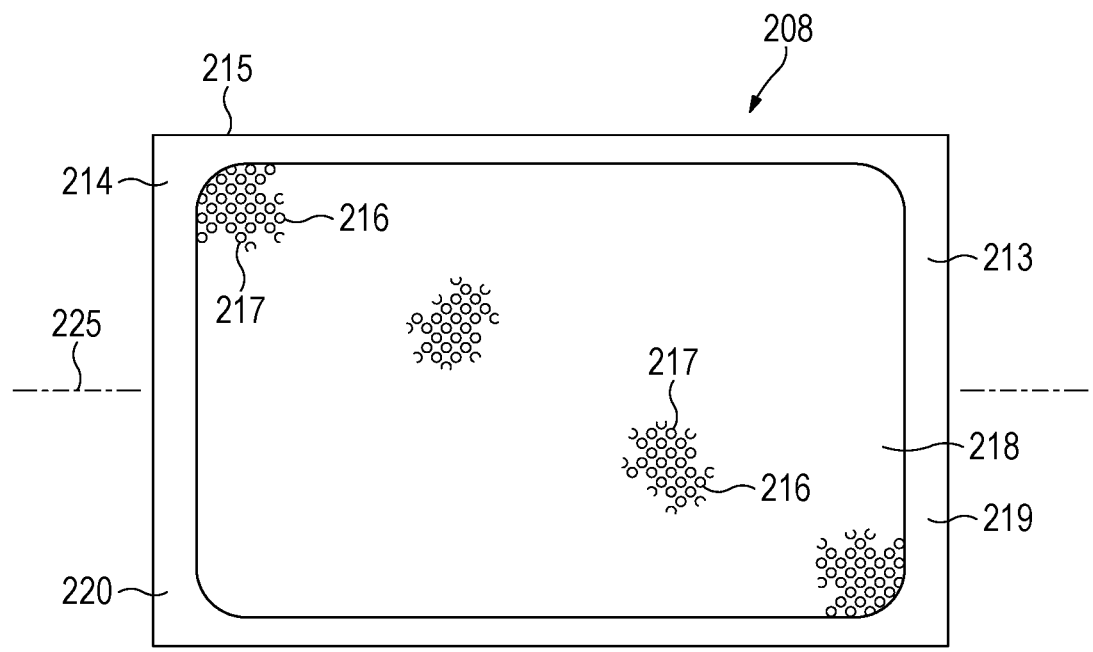
FIG. 6 is a top view of an example of a microscreen structure of the foil-microscreen assembly of FIG. 5.

Microscreen structure 208 may include any suitable structure configured to support the at least one hydrogen-selective membrane. For example, the microscreen structure may include a non-porous planar sheet 213 having generally opposed surfaces 214 and 215 configured to provide support to permeate side 212, and a plurality of apertures 216 that forms a plurality of fluid passages 217 extending between the opposed surfaces which allows the permeate stream to flow through the microscreen structure, as shown in FIG. 6. The apertures may be formed on the non-porous planar sheet via electrochemical etching, laser drilling, and other mechanical forming processes, such as stamping or die cutting. In other words, the planar sheet is made of one or more materials that do not include any openings or apertures and the only apertures or openings on that sheet are added via one or more of the above methods. In some embodiments, one or more of the apertures (or all of the apertures) may be formed on the non-porous planar sheet such that their longitudinal axis, or the longitudinal axes of the fluid passages, are perpendicular to the plane of the non-porous planar sheet, as shown in FIG. 6. The non-porous planar sheet may be any suitable thickness, such as between 100 microns and about 200 microns.

In some embodiments, microscreen structure 208 may include one or more perforated areas (or portions) 218 that include the plurality of apertures and one or more non-perforated areas (or portions) 219 that do not include (or exclude) the plurality of apertures. Although only a few apertures 216 are illustrated in FIG. 6, apertures 216 are distributed across the entire length and width of only the perforated portion(s). The perforated area(s) may be discrete or spaced from one or more other perforated areas. Non-perforated area(s) 219 may include a perimeter area (or portion) 220 that forms a frame around one or more of the perforated area(s), and/or one or more border areas (or portions) 221 that separate or define two more discrete portions of perforated areas. In other words, each perforated portion may be spaced from other adjacent discrete perforated portions by at least one border portion that is free from the plurality of apertures.

Apertures 216 may include any suitable pattern(s), shape(s), and/or size(s). In some embodiments, the apertures may be formed with one or more patterns that maximize combined aperture area while maintaining a high enough stiffness of the microscreen structure to prevent excessive deflection under a pressure load. Apertures 216 may be circles (circular) as shown in FIG. 6, elongated circles, racetrack-shaped, or stadium-shaped as shown in FIGS. 7-10, ovals, ellipses, hexagons, triangular, square, rectangular, octagons, and/or other suitable shape(s). In some embodiments, apertures 216 in the perforated area(s) may be a single consistent shape. In other embodiments, apertures 216 in the perforated area(s) may be any suitable combination of two or more different shapes, such as two or more of the above shapes.

Figure 7:
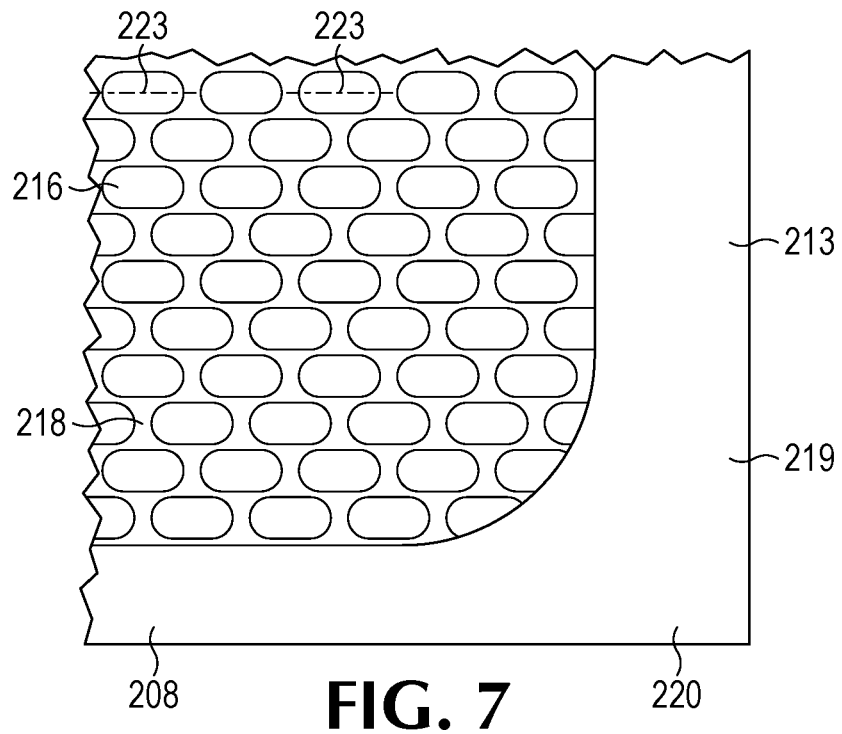
FIG. 7 is a partial view of the microscreen structure of FIG. 6 with another example of apertures.
Figure 10:
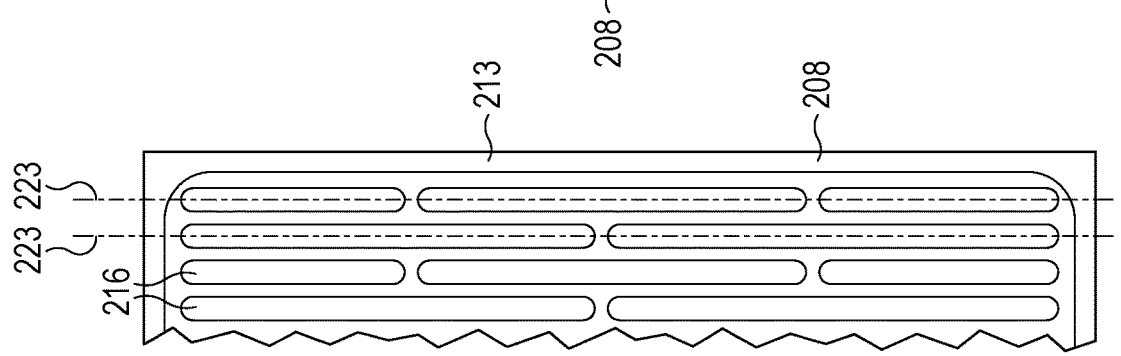
FIG. 10 is a partial view of the microscreen structure of FIG. 6 with yet another example of apertures.
Figure 9:
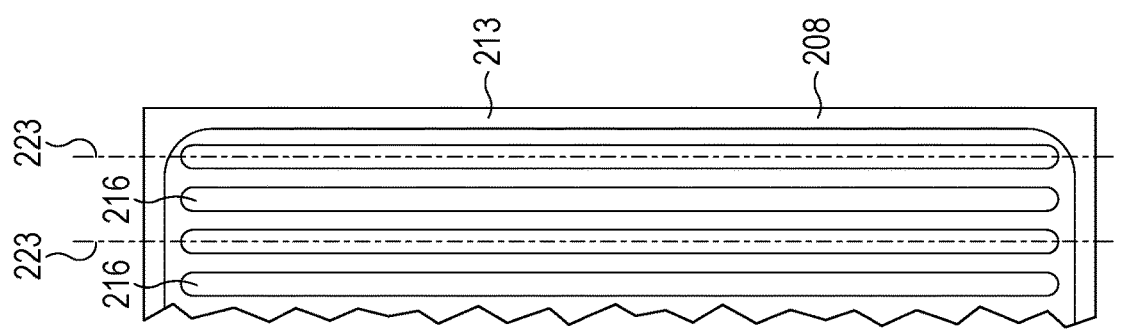
FIG. 9 is a partial view of the microscreen structure of FIG. 6 with a further example of apertures.

Apertures 216 may have any suitable orientation(s) and/or be in any suitable pattern(s). For example, FIG. 7 shows apertures 216 oriented longitudinally (or along the length of the perforated area(s) or of the planar sheet) and in series in parallel rows. In other words, each aperture 216 has a length that defines a longitudinal axis 223 and the longitudinal axes of all the apertures in FIG. 7 are parallel and/or co-axial to a longitudinal axis 225 of planar sheet 213 (shown in FIG. 6). Alternatively, FIGS. 9-10 show apertures oriented laterally (or along the width of the perforated area(s) or of the planar sheet). In other words, longitudinal axis 223 of all the apertures in the example of FIGS. 9-10 are perpendicular to longitudinal axis 225 of planar sheet 213.

Figure 8:
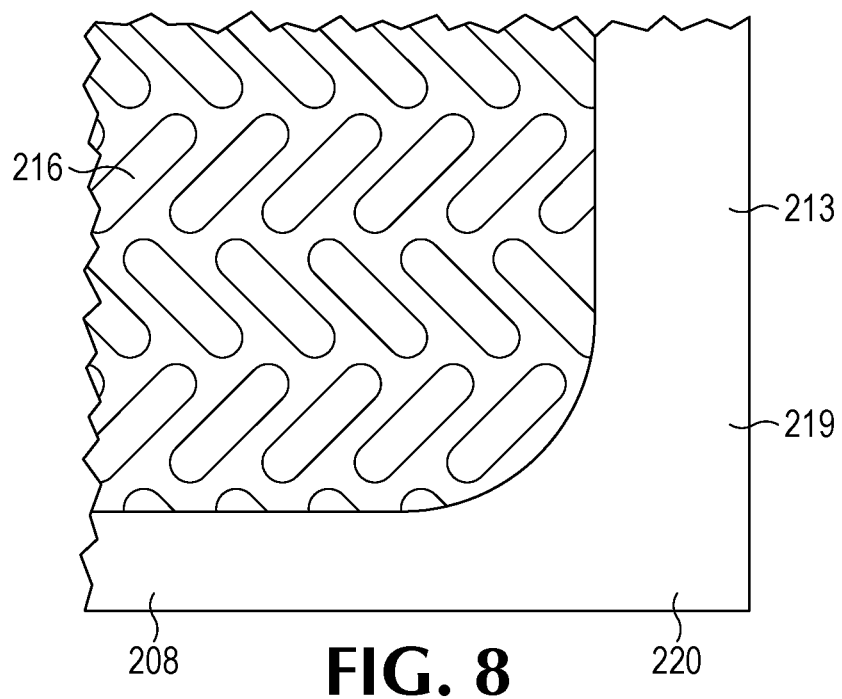
FIG. 8 is a partial view of the microscreen structure of FIG. 6 with an additional example of apertures.

Although apertures 216 are all shown to be in the same direction or orientation in FIGS. 7 and 9-10, other embodiments of planar sheet 213 may include apertures 216 with two or more directions and/or orientations. For example, apertures 216 may arranged in a staggered pattern such that the apertures in each row or column are oriented differently from the apertures in each adjacent row or column (e.g., 30, 45, 60, 90, 120 degrees). In other words, longitudinal axes 223 of apertures 216 in each row or column are parallel to each other and/or not parallel to longitudinal axes 223 of the apertures in one or more adjacent rows or columns on planar sheet 213. In one example, apertures 216 also are oriented diagonally and in series in parallel rows such that each row of apertures is oriented about ninety degrees from the adjacent rows of apertures, as shown in FIG. 8. Alternatively, or additionally, one or more apertures 216 in one or more rows and/or columns may be differently oriented than one or more other apertures in the same rows and/or columns.

The apertures may be any suitable size(s). For example, when the apertures are circles, the diameters may range from about 0.003 inches to about 0.020 inches. Additionally, when the apertures are ovals or ellipses, the radius of the rounded ends of the oval or ellipses may range from 0.001 inches to about 0.010 inches and the length of the oval or ellipses may be up to ten times the radius. Moreover, when the apertures are elongated circles or stadium-shaped, the width or diameter may range from 0.005 inches to 0.02 inches and the length may be from 0.05 inches to over ten times the diameter, such as 0.8 inches. An example of dimensions for the apertures in FIG. 8 are inches in diameter for the rounded ends and 0.028 inches in length (i.e. aspect ratio of about 3), with 0.006 inch spacing between apertures or 0.011 inches between centers of adjacent apertures. The pattern and example dimensions shown in FIG. 8 provide a total open area in the microscreen structure of about 50%.

In some examples, one or more apertures 216 may be sized to span the entire or substantially the entire width or length of the perforated area. In the example shown in FIG. 9, the stadium-shaped apertures are oriented transversely and are the entire width or substantially the entire width of the perforated area(s) or portion(s) such that the aspect ratio (length/width) is much larger than 10. An example of dimensions for the apertures in FIG. 9 are 0.005 inches to 0.02 inches width and length of up to 8 inches. The apertures may be spaced from each other by about 0.006 inches (i.e., width of the non-perforated portion or solid land between adjacent apertures) to provide a total open area of up to about 62.5%.

In some examples, apertures 216 may have a combination of sizes. For example, apertures 216 may be sized such that planar sheet 213 includes rows and/or columns of apertures having (1) a smaller number of apertures having one or more longer lengths and (2) a larger number of apertures having one or more shorter lengths. In some examples, the rows and/or columns with a smaller number of apertures having a longer length alternate with rows and/or columns with a larger number of apertures having a shorter length, such as in a staggered pattern. In the example shown in FIG. 10, apertures 216 are oriented transversely (or perpendicular to longitudinal axis 225 of planar sheet 213) and each row and/or column alternate between two apertures having longer lengths and three apertures having shorter lengths. The lengths of apertures of each row and/or column may be the same or different. An example of dimensions for the apertures in FIG. 10 are 0.005 inches to 0.02 inches width and length of 0.05 inches to 8 inches. The apertures may be spaced from each other by about 0.006 inches (i.e., width of the non-perforated portion or solid land between adjacent apertures). Other combinations of patterns, sizes, orientation, and/or shapes of apertures 216 are possible and are included in the present disclosure.

The non-porous planar sheet may include any suitable materials. For example, the non-porous planar sheet may include stainless steel. The stainless steel may include 300-series stainless steel (e.g., stainless steel 303 (aluminum modified), stainless steel 304, etc.), 400-series stainless steel, 17-7 PH, 14-8 PH, and/or 15-7 PH. In some embodiments, the stainless steel may include about 0.6 weight % to about 3.0 weight % of aluminum. In some embodiments, the non-porous planar sheet may include carbon steel, copper or copper alloys, aluminum or aluminum alloys, nickel, nickel-copper alloys, and/or base metals plated with silver, nickel, and/or copper. The base metals may include carbon steel or one or more of the stainless steels discussed above.

Figure 11:
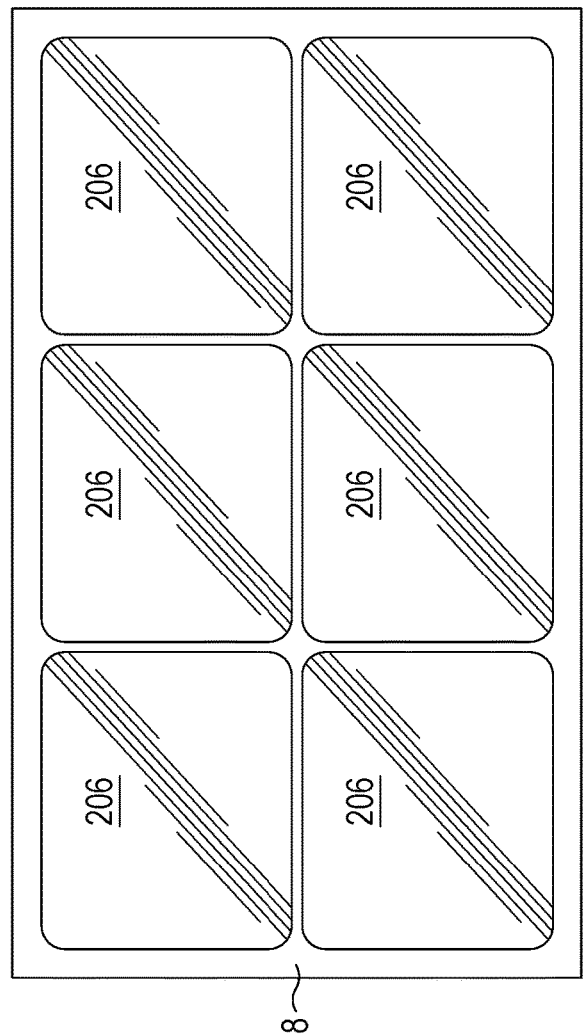
FIG. 11 is a top view of an additional example of a foil-microscreen assembly of the hydrogen purification device of FIG. 3.
Figure 12:
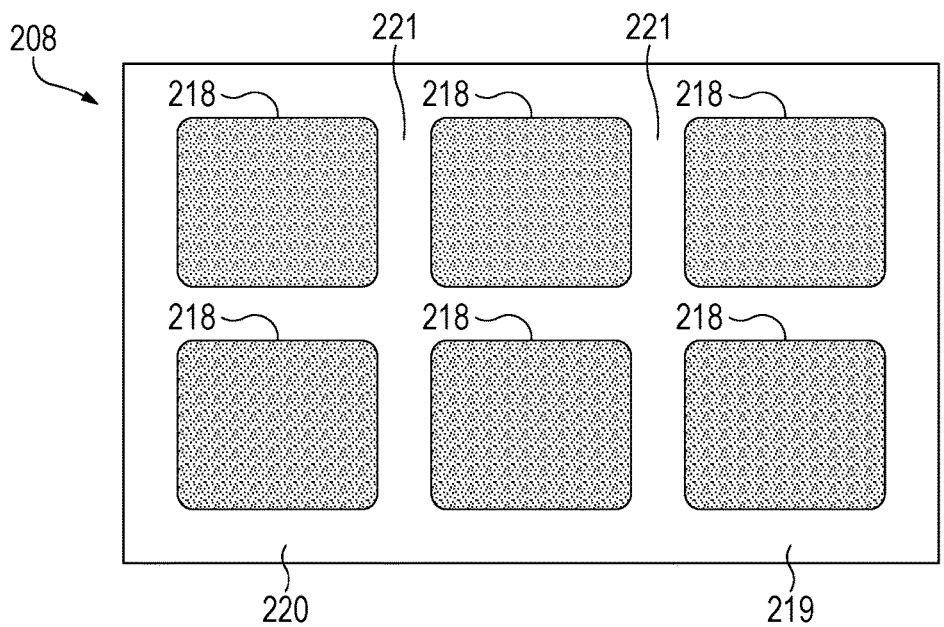
FIG. 12 is a top view of an example of a microscreen structure of the foil-microscreen assembly of FIG. 11.
Figure 13:
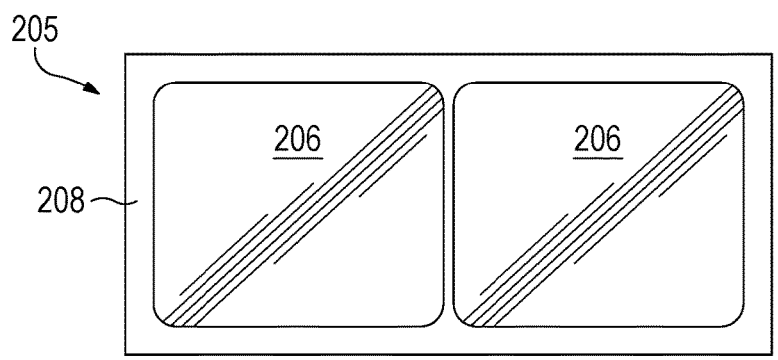
FIG. 13 is a top view of another example of a foil-microscreen assembly of the hydrogen purification device of FIG. 3.
Figure 14:
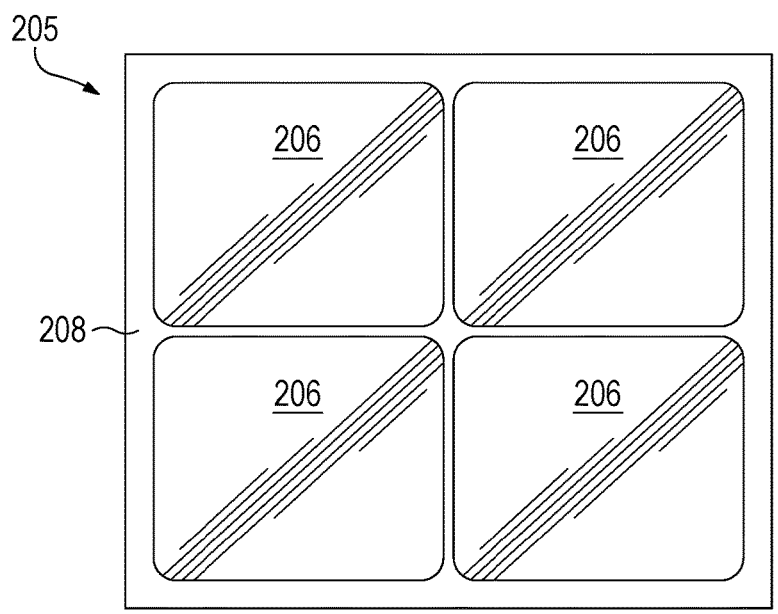
FIG. 14 is a top view of a further example of a foil-microscreen assembly of the hydrogen purification device of FIG. 3.

Hydrogen-selective membrane 206 may be sized larger than the perforated area or field of the microscreen structure such that a perimeter portion 222 of the hydrogen-selective membrane contacts one or more non-perforated areas 219 of the microscreen structure when the hydrogen-selective membrane is metallurgically bonded to the microscreen structure. In some embodiments, a single hydrogen-selective membrane may be metallurgically bonded to a single microscreen structure, as shown in FIG. 5. In other embodiments, two or more hydrogen-selective membranes 206 may be metallurgically bonded to a single microscreen structure 208. For example, two, three, four, five, six, seven, eight, nine, ten or more hydrogen-selective membranes 206 may be metallurgically bonded to a single microscreen structure 208. FIGS. 11-12 show an example foil-microscreen assembly 205 having six hydrogen-selective membranes 206 metallurgically bonded to a single microscreen structure 208. FIG. 13 shows an example foil-microscreen assembly 205 having two hydrogen-selective membranes 206 metallurgically bonded to a single microscreen structure 208, while FIG. 14 shows an example foil-microscreen assembly 205 having four hydrogen-selective membranes 206 metallurgically bonded to a single microscreen structure 208.

When two or more hydrogen-selective membranes 206 are metallurgically bonded to the microscreen structure, the microscreen structure may include two or more discrete perforated areas 218 separated by one or more non-perforated areas 219. In some embodiments, a perforated area may be sized the same as the other perforated areas 218. For example, FIG. 12 shows six discrete perforated areas 218 that are about the same size. In other embodiments, one or more perforated areas 218 may be sized smaller and/or larger than other perforated areas 218. A hydrogen-selective membrane 206 may be metallurgically bonded to each of the perforated areas, as shown in FIG. 11. Alternatively, or additionally, a hydrogen-selective membrane may be metallurgically bonded to two or more discrete perforated areas 218. Hydrogen-selective membrane(s) 206 may be sized such that perimeter portion 222 of the membrane contacts one or more non-perforated areas 219 when the membranes metallurgically bonded to one or more perforated areas 218.

Microscreen structure 208 may be sized to be contained (such as entirely contained) within the open region of the permeate frame and/or supported by the membrane support structure within that open region, as shown in FIG. 5. In other words, the microscreen structure may be sized not to contact the perimeter shell of the permeate frame when the microscreen structure and the permeate frame are secured or compressed to the first and second end frames. Alternatively, the microscreen structure may be supported by and/or secured to a non-porous perimeter wall portion or frame (not shown), such as to the perimeter shell of the permeate frame. When the microscreen structure is secured to a non-porous perimeter wall portion, the microscreen structure may be referred to as a "porous central area portion." Examples of other microscreen structures are disclosed in U.S. Patent Application Publication No. 2010/0064887, the complete disclosure of which is hereby incorporated by reference for all purposes.

Hydrogen purification device 196 also may include a plurality of plates or frames 224 disposed between and secured to the first and/or second end frames. The frames may include any suitable structure and/or may be any suitable shape(s), such as square, rectangular, or circular. For example, frames 224 may include a perimeter shell 226 and at least a first support member 228, as shown in FIG. 4. The perimeter shell may define an open region 230 and a frame plane 232. Additionally, perimeter shell 226 may include first and second opposed sides 234 and 236, and third and fourth opposed sides 238 and 240, as shown in FIG. 4.

First support member 228 may include any suitable structure configured to support a first portion 242 of foil-microscreen assembly 205, as shown in FIG. 4. For example, the first support members of the plurality of frames may be co-planar with each other (or with other first support members of other frames of the plurality of frames) within a first support plane 244 to support first portion 242 of the hydrogen-selective membrane, as shown in FIG. 4. In other words, the first support member of each frame of the plurality of frames may mirror the first support member of the other frames of the plurality of frames. The first support member may have any suitable orientation to frame plane 232. For example, first support plane 244 may be perpendicular to the frame plane, as shown in FIG. 4. Alternatively, the first membrane support plane may intersect but not be perpendicular to frame plane 232.

In some embodiments, frames 224 may include a second support member 246 and/or third support member 248, which may include any suitable structure configured to support a second portion 250 and/or a third portion 252 of foil-microscreen assembly 205, as shown in FIG. 4. For example, the second support members of the plurality of frames may be co-planar with each other (or with other second support members of the plurality of frames) within a second support plane 254 to support second portion 250 of the foil-microscreen assembly. Additionally, the third support members of the plurality of frames may be co-planar with each other (or with other third support members of the plurality of frames) within a third support plane 256 to support third portion 252 of the foil-microscreen assembly. In other words, the second support member of each frame of the plurality of frames may mirror the second support member of the other frames of the plurality of frames, while the third support member of each frame of the plurality of frames may mirror the third support member of the other frames of the plurality of frames. The second and/or third support planes may have any suitable orientation to frame plane 232. For example, second support plane 254 and/or third support plane 256 may be perpendicular to the frame plane, as shown in FIG. 4. Alternatively, the second and/or third support planes may intersect but not be perpendicular to frame plane 232.

Second support member 246 and/or third support member 248 may have any suitable orientation to first support member 228. For example, first support member 228 may extend into open region 230 from third side 238 of perimeter shell 226; second support member 246 may extend into the open region from fourth side 240 (which is opposed from the third side) of the perimeter shell; and third support member 248 may extend into the open region from the third side. Alternatively, the first, second, and/or third support members may extend into the open region from the same side, such as from the first, second, third, or fourth sides of the perimeter shell. In some embodiments, the first, second, and/or third support members may extend into the open region from the first side and/or second side (which is opposed from the first side) of the perimeter shell.

The first, second, and/or third support members may, for example, be in the form of one or more projections or fingers 258 attached to the perimeter shell and/or formed with the perimeter shell. The projections may extend from the perimeter shell in any suitable direction(s). The projections may be the full thickness of the perimeter shell or may be less than the full thickness of that shell. The projections of each frame of frames 224 may be compressed against the foil-microscreen assembly thereby locking that assembly in place. In other words, the projections of frames 224 may support the foil-microscreen assembly by being stacked extension(s) of the end frames within the first and/or second membrane support plane. In some embodiments, projection(s) 258 may include one or more receptacles or apertures (not shown) configured to receive at least one fastener (not shown) to secure frames 224 to the first and/or second end frames.

Frames 224 may include at least one feed frame 260, at least one permeate frame 262, and a plurality of gaskets or gasket frames 264, as shown in FIG. 4. Feed frame 260 may be disposed between one of the first and second end frames and at least one foil-microscreen assembly 205, or between two foil-microscreen assemblies 205. The feed frame may include a feed frame perimeter shell 266, a feed frame input conduit 268, a feed frame output conduit 270, a feed frame open region 272, at least a first feed frame support member 274, as shown in FIG. 4. In some embodiments, the feed frame may include a second feed frame support member 276 and/or a third feed frame support member 278. In some embodiments, the end plates, the foil-microscreen assemblies, and frames 224 are secured or compressed together, such as mechanically secured and/or mechanically compressed via bolts and/or other fasteners, without any metallurgical bonding and/or other types of chemical bonding between two or more components of the hydrogen purification device (other than the above described metallurgical bonding between the hydrogen-selective membrane and the coated or uncoated microscreen structure within the foil-microscreen assembly(ies)). For example, there are no gaskets and/or frames metallurgically or otherwise chemically bonded to the hydrogen-selective membrane(s) and/or the microscreen structure(s) of the foil-microscreen assembly(ies) and to all other components of the hydrogen purification device.

Figure 15:
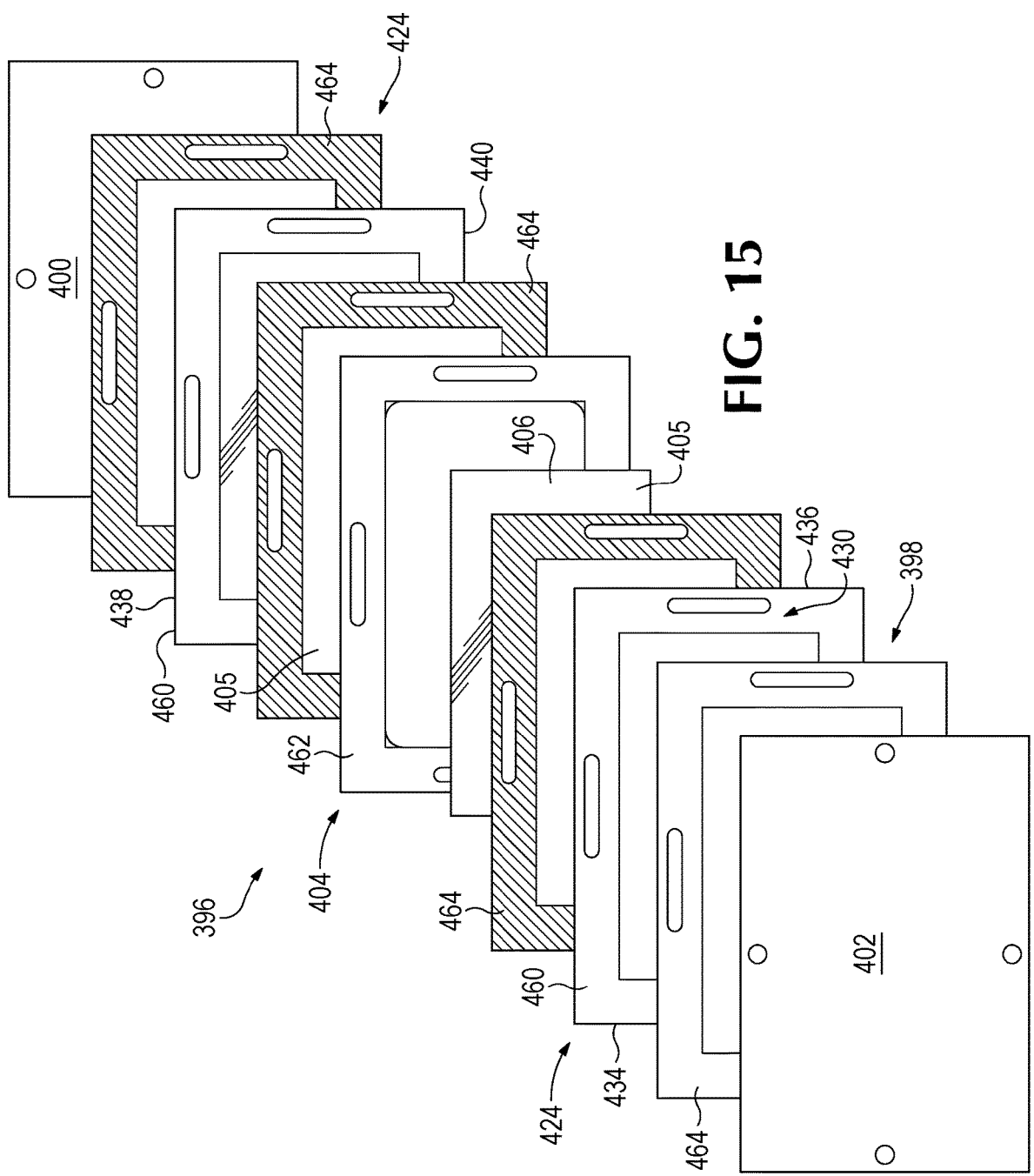
FIG. 15 is an exploded isometric view of another example of the hydrogen purification device of FIG. 3.

Another example of hydrogen purification device 144 is generally indicated at 396 in FIG. 15. Unless specifically excluded, hydrogen purification device 396 may include one or more components of other hydrogen purification devices and/or purification regions described in this disclosure.

Hydrogen purification device 396 is similar in many respects to hydrogen purification device 196 but with different-shaped frames, no support members, different-sized foil-microscreen assemblies, and less gasket frames, as further described below. Components or parts of hydrogen purification device 396 correspond to components or parts of hydrogen purification device 196, and are labeled with similar reference numbers in FIG. 15 having the general form "3XX" rather than "1XX" and "4XX" rather than "2XX." Accordingly, features 398, 400, 402, 404, 405, 406, 408, 424, 426, 434, 436, 438, 440, 460, 462, 464, etc. may be identical or substantially identical to their respective counterparts in hydrogen purification device 196, namely features 198, 200, 202, 204, 205, 206, 208, 224, 226, 234, 236, 238, 240, 260, 262, 264, etc.

Hydrogen purification device 396 may include a shell or enclosure 398, which may include a first end plate or end frame 400 and a second end plate or end frame 402. The first and second end plates may be configured to be secured and/or compressed together to define a sealed pressure vessel having an interior compartment 404 in which the hydrogen-separation region is supported.

Hydrogen purification device 396 also may include at least one foil-microscreen assembly 405, which may be disposed between and/or secured to the first and second end plates. The foil-microscreen assembly may include at least one hydrogen-selective membrane 406 and at least one microscreen structure 408. One or more of the hydrogen-selective membranes may be metallurgically bonded to microscreen structure 408. For example, one or more of hydrogen-selective membranes 406 may be diffusion bonded to the microscreen structure to form a solid-state diffusion bond between the membrane(s) and the microscreen structure. Foil-microscreen assembly 405 is sized to fit the open region of the permeate frame and is thus smaller in length and width as compared or relative to foil-microscreen assembly 205.

Hydrogen purification device 396 also may include a plurality of plates or frames 424 disposed between and secured to the first and/or second end frames. Frames 424 may include a perimeter shell 426. The perimeter shell may define an open region 430. Additionally, perimeter shell 426 may include first and second opposed sides 434 and 436, and third and fourth opposed sides 438 and 440. Unlike frames 224 of hydrogen purification device 196, frames 424 do not include any support members.

Frames 424 may include at least one feed frame 460, at least one permeate frame 462, and a plurality of gaskets or gasket frames 464. Feed frame 460 may be disposed between one of the first and second end frames and at least foil-microscreen assembly 405, or between two foil-microscreen assemblies 405. The feed frame may include at least substantially similar components as feed frame 260, such as a feed frame perimeter shell, a feed frame input conduit, a feed frame output conduit, and/or a feed frame open region.

Permeate frame 462 may be positioned such that the at least one foil-microscreen assembly is disposed between one of the first and second end frames and the permeate frame or between two foil-microscreen assemblies. The permeate frame may include at least substantially similar components as permeate frame 262, such as a permeate frame perimeter shell, a permeate frame output conduit, a permeate frame open region, and/or a membrane support structure.

Frames 424 also may include gaskets or gasket frames 464. The gasket frames may include any suitable structure configured to provide fluid-tight interfaces among the other frames, such as between first and second end plates 400 and 402 and feed frames 460, and/or between feed frames 460 and foil-microscreen assemblies 405. Unlike hydrogen purification device 196, hydrogen purification device 396 does not include gasket frames 464 between the foil-microscreen assemblies and permeate frame 462. Similar to hydrogen purification device 196, the widths of the feed frame and the gasket frames are larger than the widths of the permeate frame (or the open region of the feed frame and the gasket frames is smaller than the open region of the permeate frame) such that the extra width covers the edge of the foil-microscreen assemblies to eliminate or minimize leak from the feed side to the permeate side or from the permeate side to the feed side (e.g., extra width of the feed frames and gasket frames to cover the edge of the foil-microscreen assemblies). In some embodiments, the extra width corresponds to the width of the perimeter (non-perforated) portion of the microscreen structure of the foil-microscreen assemblies.

INDUSTRIAL APPLICABILITY

The present disclosure, including hydrogen purification devices and components of those devices, is applicable to the fuel-processing and other industries in which hydrogen gas is purified, produced, and/or utilized.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A hydrogen purification device, comprising:
   first and second end frames including:
      an input port configured to receive a mixed gas stream containing hydrogen gas and other gases;
      an output port configured to receive a permeate stream containing at least one of a greater concentration of hydrogen gas and a lower concentration of the other gases than the mixed gas stream; and
      a byproduct port configured to receive a byproduct stream containing at least a substantial portion of the other gases;
   at least one foil-microscreen assembly disposed between and secured to the first and second end frames, the at least one foil-microscreen assembly including:
      at least one hydrogen-selective membrane having a feed side and a permeate side, at least part of the permeate stream being formed from the portion of the mixed gas stream that passes from the feed side to the permeate side, with the remaining portion of the mixed gas stream, which remains on the feed side, forming at least part of the byproduct stream, and
      at least one microscreen structure including a non-porous planar sheet having a plurality of apertures forming a plurality of fluid passages, each aperture of the plurality of apertures having a length that defines a longitudinal axis, the plurality of apertures being positioned on the non-porous planar sheet in a plurality of rows, the longitudinal axis of an aperture of the plurality of apertures of a row of the plurality of rows being not parallel to the longitudinal axis of an aperture of the plurality of apertures of an adjacent row of the plurality of rows, the non-porous planar sheet including generally opposed planar surfaces configured to provide support to the permeate side, the plurality of fluid passages extending between the opposed surfaces, wherein the at least one hydrogen-selective membrane is metallurgically bonded to the at least one microscreen structure; and
   a plurality of frames disposed between the first and second end frames and the at least one foil-microscreen assembly and secured to the first and second end frames, each frame of the plurality of frames including a perimeter shell defining an open region.

2. The device of claim 1, wherein the non-porous planar sheet includes two or more discrete portions having the plurality of apertures, and wherein each discrete portion of the two or more discrete portions is spaced from adjacent discrete portions of the two or more discrete portions by at least one border portion that is free from the plurality of apertures.

3. The device of claim 2, wherein the at least one hydrogen-selective membrane includes two or more hydrogen-selective membranes, and wherein a different hydrogen-selective membrane of the two or more hydrogen-selective membranes is metallurgically bonded to each discrete portion of the two or more discrete portions.

4. The device of claim 3, wherein each hydrogen-selective membrane of the two or more hydrogen-selective membranes is sized larger than the corresponding discrete portion such that a perimeter portion of the hydrogen-selective membrane contacts one or more portions of the non-porous planar sheet that do not include the plurality of apertures.

5. The device of claim 1, wherein the at least one hydrogen-selective membrane is diffusion bonded to the at least one microscreen structure.

6. A hydrogen purification device, comprising:
   first and second end frames including:
      an input port configured to receive a mixed gas stream containing hydrogen gas and other gases;
      an output port configured to receive a permeate stream containing at least one of a greater concentration of hydrogen gas and a lower concentration of the other gases than the mixed gas stream; and a byproduct port configured to receive a byproduct stream containing at least a substantial portion of the other gases;

at least one foil-microscreen assembly disposed between and secured to the first and second end frames, the at least one foil-microscreen assembly including:

at least one hydrogen-selective membrane having a feed side and a permeate side, at least part of the permeate stream being formed from the portion of the mixed gas stream that passes from the feed side to the permeate side, with the remaining portion of the mixed gas stream, which remains on the feed side, forming at least part of the byproduct stream, and at least one microscreen structure including a non-porous planar sheet having a plurality of stadium-shaped apertures forming a plurality of fluid passages, at least one aperture of the plurality of stadium-shaped apertures having a length that is at least ten times the radius of the aperture, the planar sheet including generally opposed planar surfaces configured to provide support to the permeate side, the plurality of fluid passages extending between the opposed surfaces, wherein the at least one hydrogen-selective membrane is metallurgically bonded to the at least one microscreen structure; and a plurality of frames disposed between the first and second end frames and the at least one foil-microscreen assembly and secured to the first and second end frames, each frame of the plurality of frames including a perimeter shell defining an open region.

7. The device of claim 6, wherein the non-porous planar sheet includes a length and a width, the plurality of stadium-shaped apertures being disposed along a substantial portion of the length and a substantial portion of the width of the non-porous planar sheet.

8. The device of claim 7, wherein one or more stadium-shaped apertures of the plurality of stadium-shaped aperture have a length that is a substantial portion of the width of the non-porous planar sheet.

9. The device of claim 6, wherein the plurality of stadium-shaped apertures is positioned on the non-porous planar sheet in a plurality of columns such that (1) the longitudinal axes of the stadium-shaped apertures of the plurality of stadium-shaped apertures in each column of the plurality of columns are parallel to each other and to stadium-shaped apertures of the plurality of stadium-shaped apertures of an adjacent column of the plurality of columns and (2) the length of each stadium-shaped aperture in each column of the plurality of columns is different from the length of one or more stadium-shaped apertures of an adjacent column of the plurality of columns.

10. The device of claim 6, wherein the non-porous planar sheet includes two or more discrete portions having the plurality of stadium-shaped apertures, and wherein each discrete portion of the two or more discrete portions is spaced from adjacent discrete portions of the two or more discrete portions by at least one border portion that is free from the plurality of stadium-shaped apertures.

11. The device of claim 10, wherein the at least one hydrogen-selective membrane includes two or more hydrogen-selective membranes, and wherein a different hydrogen-selective membrane of the two or more hydrogen-selective membranes is metallurgically bonded to each discrete portion of the two or more discrete portions.

12. The device of claim 11, wherein each hydrogen-selective membrane of the two or more hydrogen-selective membranes is sized larger than the corresponding discrete portion such that a perimeter portion of the hydrogen-selective membrane contacts one or more portions of the non-porous planar sheet that do not include the plurality of stadium-shaped apertures.

13. The device of claim 6, wherein the at least one hydrogen-selective membrane is diffusion bonded to the at least one microscreen structure.

14. A foil-microscreen assembly, comprising:

at least one hydrogen-selective membrane having a feed side and a permeate side, wherein the at least one hydrogen-selective membrane is configured to receive a mixed gas stream, to form a permeate stream from the portion of the mixed gas stream that passes from the feed side to the permeate side, and to form a byproduct stream from the remaining portion of the mixed gas stream that remains on the feed side; and at least one microscreen structure including a non-porous planar sheet having a plurality of apertures forming a plurality of fluid passages, each aperture of the plurality of apertures having a length that defines a longitudinal axis, the plurality of apertures being positioned on the non-porous planar sheet in a plurality of rows, the longitudinal axis of an aperture of the plurality of apertures of a row of the plurality of rows being not parallel to the longitudinal axis an aperture of the plurality of apertures of an adjacent row of the plurality of rows, the non-porous planar sheet includes generally opposed planar surfaces configured to provide support to the permeate side, the plurality of fluid passages extending between the opposed surfaces, wherein the permeate side of the at least one hydrogen-selective membrane is metallurgically bonded to the at least one microscreen structure.

15. The assembly of claim 14, wherein the non-porous planar sheet includes two or more discrete portions having the plurality of apertures, and wherein each discrete portion of the two or more discrete portions is spaced from adjacent discrete portions of the two or more discrete portions by at least one border portion that is free from the plurality of apertures.

16. The assembly of claim 15, wherein the at least one hydrogen-selective membrane includes two or more hydrogen-selective membranes, and wherein a different hydrogen-selective membrane of the two or more hydrogen-selective membranes is metallurgically bonded to each discrete portion of the two or more discrete portions.

17. The assembly of claim 16, wherein each hydrogen-selective membrane of the two or more hydrogen-selective membranes is sized larger than the corresponding discrete portion such that a perimeter portion of the hydrogen-selective membrane contacts one or more portions of the non-porous planar sheet that do not include the plurality of stadium-shaped apertures.

18. The device of claim 14, wherein the at least one hydrogen-selective membrane is diffusion bonded to the at least one microscreen structure.

19. A foil-microscreen assembly, comprising:

at least one hydrogen-selective membrane having a feed side and a permeate side, wherein the at least one hydrogen-selective membrane is configured to receive a mixed gas stream, to form a permeate stream from the portion of the mixed gas stream that passes from the feed side to the permeate side, and to form a byproduct stream from the remaining portion of the mixed gas stream that remains on the feed side; and at least one microscreen structure including a non-porous planar sheet having a plurality of stadium-shaped apertures forming a plurality of fluid passages, at least one aperture of the plurality of stadium-shaped apertures having a length that is at least ten times the radius of the aperture, the planar sheet includes generally opposed planar surfaces configured to provide support to the permeate side, the plurality of fluid passages extending between the opposed surfaces, wherein the permeate side of the at least one hydrogen-selective membrane is metallurgically bonded to the at least one microscreen structure.

20. The assembly of claim 19, wherein the non-porous planar sheet includes two or more discrete portions having the plurality of stadium-shaped apertures, and wherein each discrete portion of the two or more discrete portions is spaced from adjacent discrete portions of the two or more discrete portions by at least one border portion that is free from the plurality of apertures.

21. The assembly of claim 20, wherein the at least one hydrogen-selective membrane includes two or more hydrogen-selective membranes, and wherein a different hydrogen-selective membrane of the two or more hydrogen-selective membranes is metallurgically bonded to each discrete portion of the two or more discrete portions.

22. The assembly of claim 21, wherein each hydrogen-selective membrane of the two or more hydrogen-selective membranes is sized larger than the corresponding discrete portion such that a perimeter portion of the hydrogen-selective membrane contacts one or more portions of the non-porous planar sheet that do not include the plurality of apertures.

23. The assembly of claim 19, wherein the at least one hydrogen-selective membrane is diffusion bonded to the at least one microscreen structure.

* * * * *